United States Patent [19]

Main et al.

[11] 4,366,481

[45] Dec. 28, 1982

[54] VENDING MACHINE ACQUISITION SYSTEM

[75] Inventors: David T. Main, Boulder Creek; John B. Riddle, Palo Alto; Rod H. Allen, Mountain View, all of Calif.

[73] Assignee: Micro Magnetic Industries, Inc., Palo Alto, Calif.

[21] Appl. No.: 282,076

[22] Filed: Jul. 10, 1981

Related U.S. Application Data

[63] Continuation of Ser. No. 134,271, Mar. 26, 1980.

[51] Int. Cl.[3] .......................... G06K 5/02; G06F 7/00; H04Q 9/00

[52] U.S. Cl. .......................... 340/825.54; 340/825.55

[58] Field of Search ...................... 340/825.54, 825.05; 364/411, 412

[56] References Cited

U.S. PATENT DOCUMENTS 4,072,930 2/1978 Lucero .......................... 340/825.54

*Primary Examiner*—Harold I. Pitts

*Attorney, Agent, or Firm*—Limbach, Limbach & Sutton

[57] ABSTRACT

Data from vending machines are acquired by a resident data acquisition unit (DAU) implanted in each vending machine. This unit senses coins in, coins out, products dispensed and door openings, among other activities, and provides a data base which records all of these activities. The DAU also determines whether a door opening was unauthorized and, if so, includes in the data base an indication of an unauthorized entry and the relative time of that entry. Each vending machine data acquisition unit (DAU) is interrogated by a data transfer unit (DTU) carried by a route service person and the information from each DAU is stored in the data transfer unit. Each DTU has an identification code number by which it identifies itself to the DAU whenever an interrogation is attempted. This identification code number is stored by the DAU in the data base as part of the information which is provided to subsequent interrogating DTUs. The data transfer unit then disgorges the recorded information in a central data converting unit (DCU) which services a number of DTUs. The data converting unit provides an instant summary of the information by vending machine and route, and also converts the information to standard computer language for subsequent processing in a full-size computer. Included in the information summary is a listing of the identification code number for each of the last four DTUs to interrogate the particular DAU, along with the time of each interrogation, and unauthorized entry flag, if applicable. The time of any unauthorized entry, where no interrogation was attempted, is also listed and flagged.

7 Claims, 29 Drawing Figures

| IC | CMOS +5v | REG VCC | GND |
|---|---|---|---|
| 1 | X | 28 | 14 |
| 2 | X | 16 | 8 |
| 3 | X | 16 | 8 |
| 4 | X | 16 | 8 |
| 5 | 1 | X | 8 |
| 6 | 16 | X | 8 |
| 7 | 16 | X | 8 |
| RESIS. | X | ALL 4,5 | X |
| 8 | X | 14 | 7 |

| FIG. 6A. | FIG. 6B. | FIG. 6C. |
|---|---|---|
| FIG. 6D. | FIG. 6E. | FIG. 6F. |

| FIG. 10A | FIG. 10B |
| --- | --- |

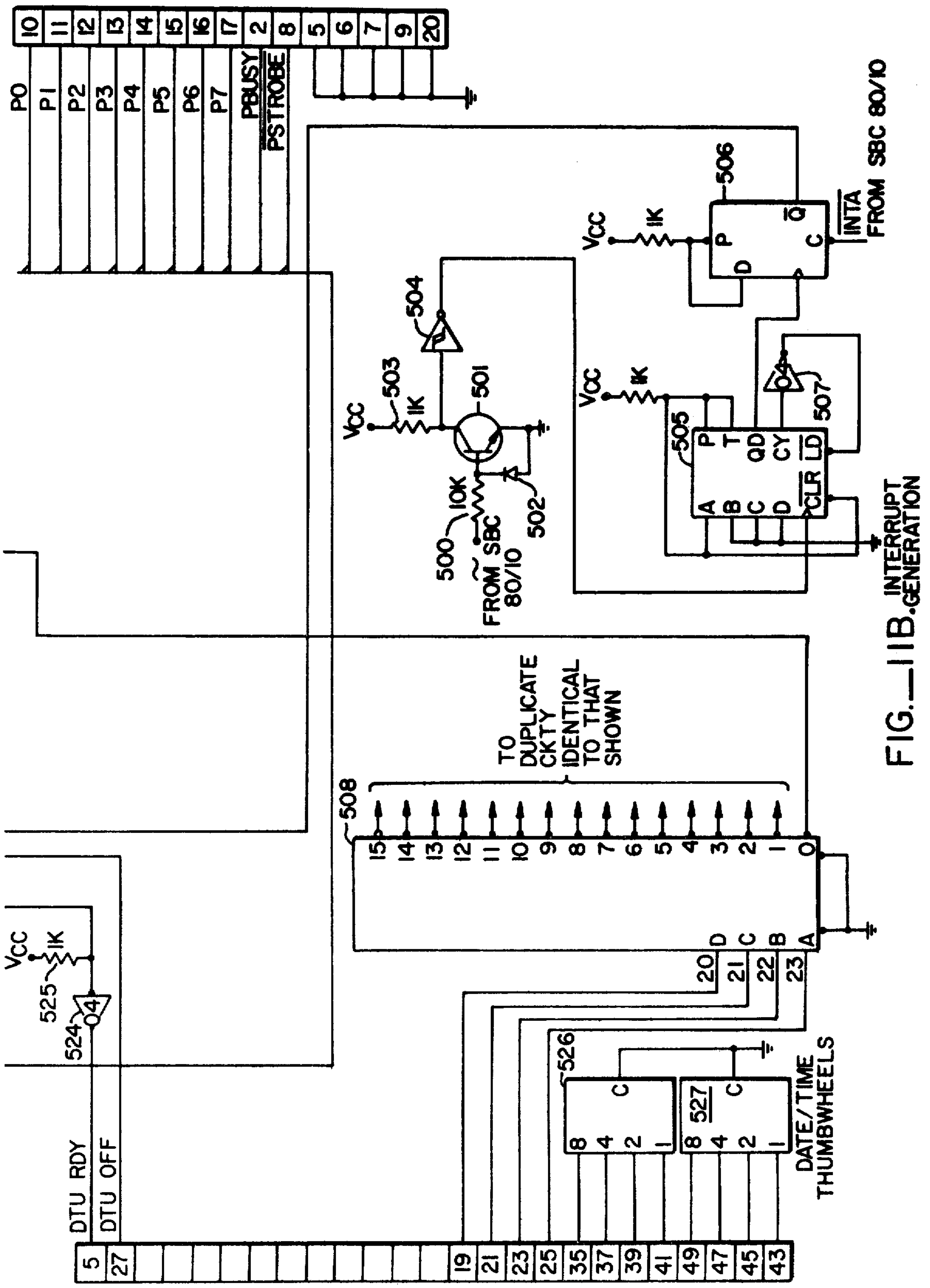
FIG.__11B. INTERRUPT GENERATION

VENDING MACHINE ACQUISITION SYSTEM

This is a continuation of copending Application Ser. No. 134,271 filed on Mar. 26, 1980.

BACKGROUND OF THE INVENTION

This invention pertains to vending systems, and more particularly to a system in which data from various vending machines are acquired transferred and totalized by separate units.

As those skilled in the art are well aware, there are numerous problems in operating a system of vending machines in terms of cash and product accountability, as well as a relatively high overhead cost in servicing the machines. A large factor in the overhead cost in servicing the machines is the time required to take account of the inventory sold as well as the cash received and dispensed by the vending machine. Furthermore, a number of security problems arise in the operation of such vending machines. For example, there are constant problems of theft from the machine by unauthorized persons, theft of either inventory or cash by the employees of the vending machine owner, and the problem of the vending machine employees running a second business on top of the owner's business.

In this last situation, the person servicing the vending machines purchases his or her own inventory and stocks it in the machine along with the owner's inventory. The owner receives cash appropriate to the proportionate sale of its own inventory, but the route person collects the balance of the cash reflecting the sales of his or her own inventory. In effect, two businesses are being run from the same vending machine; however, the route person does not have the expense of paying for the vending machine or having to share the profits with the owner of the premises on which the vending machine is installed. Heretofore, no comprehensive, electronic data acquisition system has been proposed for use in vending machines. Still another problem is that any such system must be easily retrofittable to all types of vending machines.

SUMMARY OF THE INVENTION

The claims of the above identified co-pending Application Ser. No. 134,271 are directed to an electronic data collection system (EDAC) which includes (1) an electronic data acquisition unit (DAU) in each machine to record product sales, cash box totals, time of service entrance, whether cash box is collected; (2) a data transfer unit (DTU) to be carried by the route service person to transfer data from the microprocessor in the machine to his or her unit; and (3) a headquarters-based data conversion unit (DCU) to receive the accumulated information from the several DTUs at the end of the work day. The DCU in turn may hook up with any computer the operator may be using for overall information processing.

EDAC provides an immediate printout for each of the machines serviced when the route person connects his/her DTU to the central DCU. The printout summarizes the transactions for each machine serviced that day along with a daily route activity record. A flip of a switch on the DCU will produce an expanded listing of activity for each machine. Exceptions are flagged and listed on both the route cash/collection summary and expanded listing whenever a power failure is recorded.

Information from eah EDAC-equipped vending machine is collected as follows:

(1) The DAU records cash as it is received and accumulates this with adjustments for change paid out. Cash box totals are precise because the device tracks whether coins go to refill changer tubes or into the cash box.

(2) Product vended is also recorded in units on a percolumn basis if the machine delivers multiple products at multiple prices. Product movement can serve as source data for sales analyses and inventory control.

(3) The DTU communicates electro-optically to extract accumulated data before each entrance.

(4) Cash box totals are maintained over nine access-door openings. "Taken" is noted if a collection is indicated by the motion sensor attached to the cash box. Cryptographic scrambling guarantees security and data integrity; lost information is bridged by retention of totals for the previous four accesses.

(5) Upon return to headquarters, a relatively inexpensive intelligent terminal, the DCU unscrambles and prints out a route sales/cash summary report each time the route person returns his/her portable DTU to the branch or headquaters office. Power down data retention and compatibility of data transfer to any modern computer are some of the additional features that make this system adaptable for vending operators.

The DTUs are easily retro-fittable to any vendor in current use. For multiple-product/multiple-price machines, the system can accommodate up to 48 columns. If column records can be combined or are less than 48, the DAU coverage may be expanded to adjacent machines through the use of special ribbon cable "extenders". Expander printed circuit cards are available to link up to three vendors for cash and column data gathering in blocks of eight or sixteen columns. These may be adjacent machines but must be in the same bank.

In a modified embodiment, a device called ETOT is an electronic totalizer used with single-price machines. This small unit is self-powered and operates by direct connection to the DUT within 20 seconds after the machine door is opened. The DTU carried by the route person is a battery-operated, computerized recorder that will interrogate, verify and store data from as many as 75 machine activity records.

Effective functioning of the total EDAC system does not require access to a complete computerized data processing system. The route sales/cash and activity reports are produced as a self-contained package from information maintained in each vending machine's data recording unit.

EDAC may, however, be connected to any modern computer system by its universal RS-232C output connection. When used in conjunction with a computer's data base, it serves as the automatic data source to update transactions daily. Management information that can be improved with EDAC's accurate input to a computerized data processing system includes location P/L statements, route planning and performance reports, cash reconciliations, inventory control documents, order preparation, product/location sales analyses, etc.

In the present invention, each time the door of a vending machine is opened the resident DAU records the fact that a machine access has occurred and the time of such access. The access time is derived from an internal clock within the DAU. If the DAU has not been interrogated before the machine access is detected, the DAU designates the particular access as unauthorized.

Additionally, whenever a DTU attempts an interrogation of a DAU, the identification number of the DTU is transferred from the DTU to the DAU, and the DAU records the time of the interrogation.

In the present invention, the DAU stores the above machine access indication, access time, access status, interrogating DTU identification number, and time of interrogation information as part of the summarized data which are transferred from the DAU to the DTU during an authorized interrogation.

In the present invention, the above summarized data are then transported in the DTU to the headquarters-based DCU. The DCU receives the summarized data and, as a part of the report prepared by the DCU for the particular vending machine with which the DAU is associated, includes a listing of the times and authorization status of a predetermined number of the most recent machine accesses, and the DTU identification numbers and times of a predetermined number of the most recent interrogation attempts.

In the present invention, the above listing is correlated to the other information included in the report according to the event times and DTU identification numbers. The availability of and the ability to obtain such information permit a vending machine system having true accountability to be realized.

It is therefore an object of the present invention to provide an electronic data system for vending machines which provides true accountability between route persons and vending machine transactions.

It is another object of the present invention to provide an electronic data system in which a record is maintained of any machine accesses, times of each access, authorization status of such access, and identification number of the interrogator in any interrogation access.

The foregoing and other objectives, features and advantages of the present invention will be more readily understood upon consideration of the following detailed description of certain preferred embodiments of the invention, taken in conjunction with the accompanying drawings.

DESCRIPTION OF THE PREFERRED EMBODIMENTS

Figure 1:
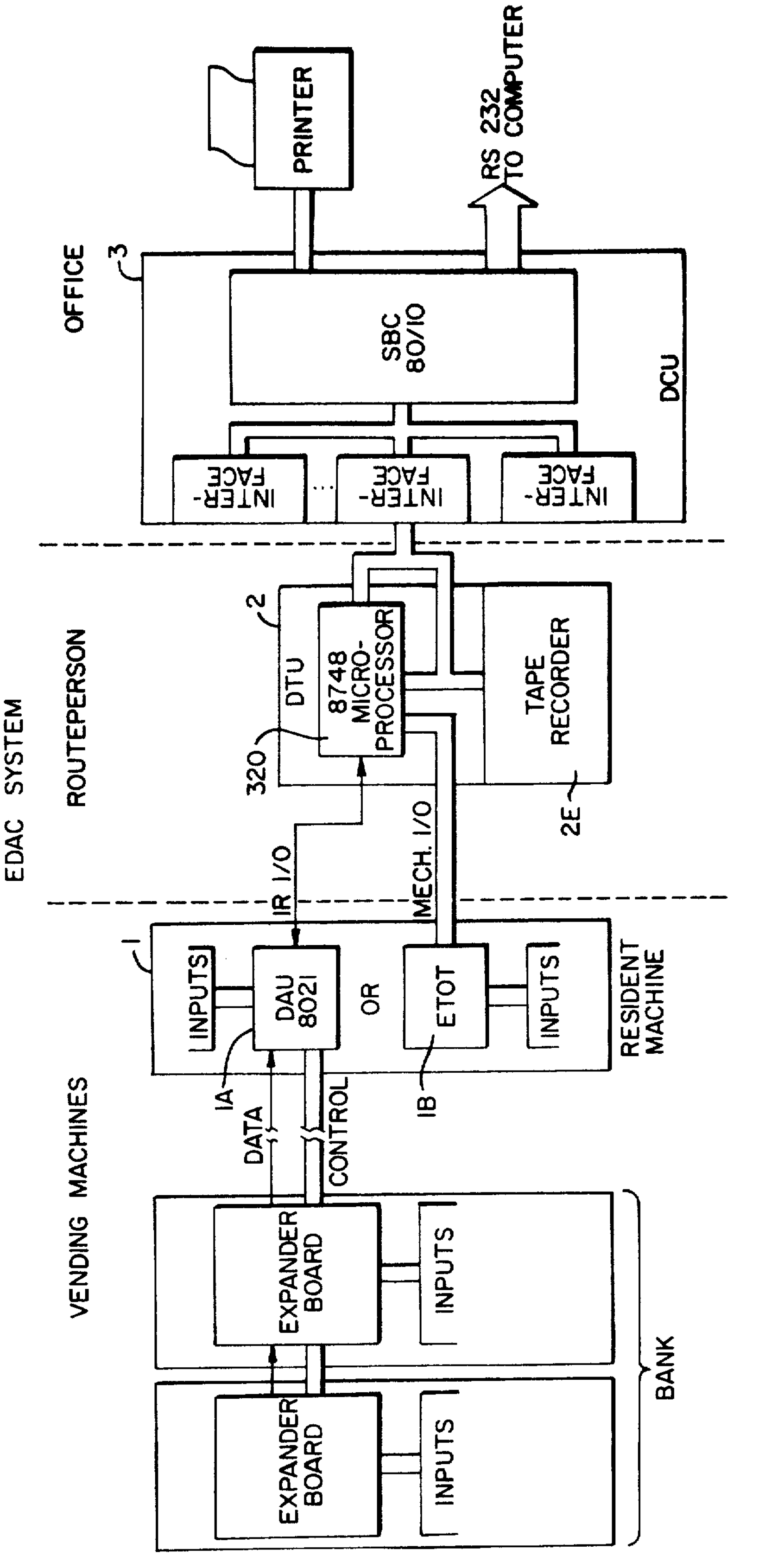
FIG. 1 is a block diagram of the electronic data collection system according to the invention.

Referring now to FIG. 1, the system of the present invention provides remote electronic monitoring of activity on vending routes for direct input into computerized data processing system.

The resident monitor, or Data Acquisition Unit (DAU) 1A is built around a small microprocessor chip with an expanded electronic memory to hold the activity data collected. Communication of stored information is enabled without entry into the machine by an external port which communicates optically with a small hand-held pocket "light pistol" or portable Data Transfer Unit (DTU) 2. Small enough for pocket or belt attachment, the DTU can collect transactions from one to one hundred machines on a daily, weekly or monthly basis. Route data in the monitor and transfer units are scrambled for security and each entry or data acquisition records the identification number of the machine and the holder of the light pistol (DTU). One Data Converting Unit (DCU) 3 at the headquarters to which the route people, mechanics or supervisors return their Data Transfer Units, unscrambles the data into standard computer language (RS232C) for immediate read-out or deferred batch transmission to a central computer for data processing.

Information provided by the system summarizes monies received and change paid out, calculating cash box totals on collection with automatic tracking of coins in the change tubes for complete cash accountability. In an optional embodiment, sales of product by column selection are totalized with cumulative dollars for each column's sales. Additionally, an identification number of each authoized entry into the machine or acquisition of data if no entry is made is recorded with the time it occurred. Entry without identification via a light pistol is recorded as an alarmed opening, indicating its time of occurrence. An historical record of the last four entries and data acquisitions, with the cash totals at that time, is listed for input into the data stream at the next authorized entry or external audit.

In the event of power failure, the system provides advance recognition of the occurrence and, completing transactions underway, it stores all data in a non-volatile memory (RAM) which protects continuity until power has been re-established and steadied down. Time of power down is also recorded and reported in this system.

The self-contained Data Acquisition Unit (DAU) is specifically designed for independent installation and/or retrofitting into any existing vending machine whether electrical or mechanical. The DAU provides no control functions but does monitor coins taken in for credit by the coin mechanism and coins paid out as change after a product is selected or a single price vend credit is established. Eight input lines into the DAU are committed to cash entry. Namely, dollars, door, quarters, dimes and nickels in; quarters, dimes or nickels out.

Each DAU keeps the last and present figures for cash and sales. The DCU notes the difference. Each access to the vending machine summarizes data in the DAU. The DAU also outputs the last four entries, time of entry, person entering and sales summaries at each entry.

Column selection and vend data are converted in the DAU from any of the following sources: AC from 12 to 200 volts, 50 or 60 cycle; DC from the same low to high voltage and presence or absence of a grounding signal; and mechanical movement with installation of an inexpensive reliable magnetic sensor. The adaptive program logic determines from these alternatives what the steady state condition in various machines is and on sensing a change from that steady state, it initiates an input signal to the microprocessor.

The DAU inputs of the present invention are floating and protected by one million ohms (1 meg) so that the micro-amps of current that signal sensors draw are not dangerous and are less than leakage current in UL recognized devices. Connection to individual machines is tailored for attachment at existing tie points that do not require field soldering or displacement of existing wiring.

Battery back-up, integrally provided on the printed circuit board, will maintain DAU data for weeks or months with minuscule drain required to retain memory in the CMOS RAM devices. Housed in a closed metal case with its alarm howler, the DAU senses and records any attempts to disconnect or tamper with this self-contained unit.

Figures 2, 2A:
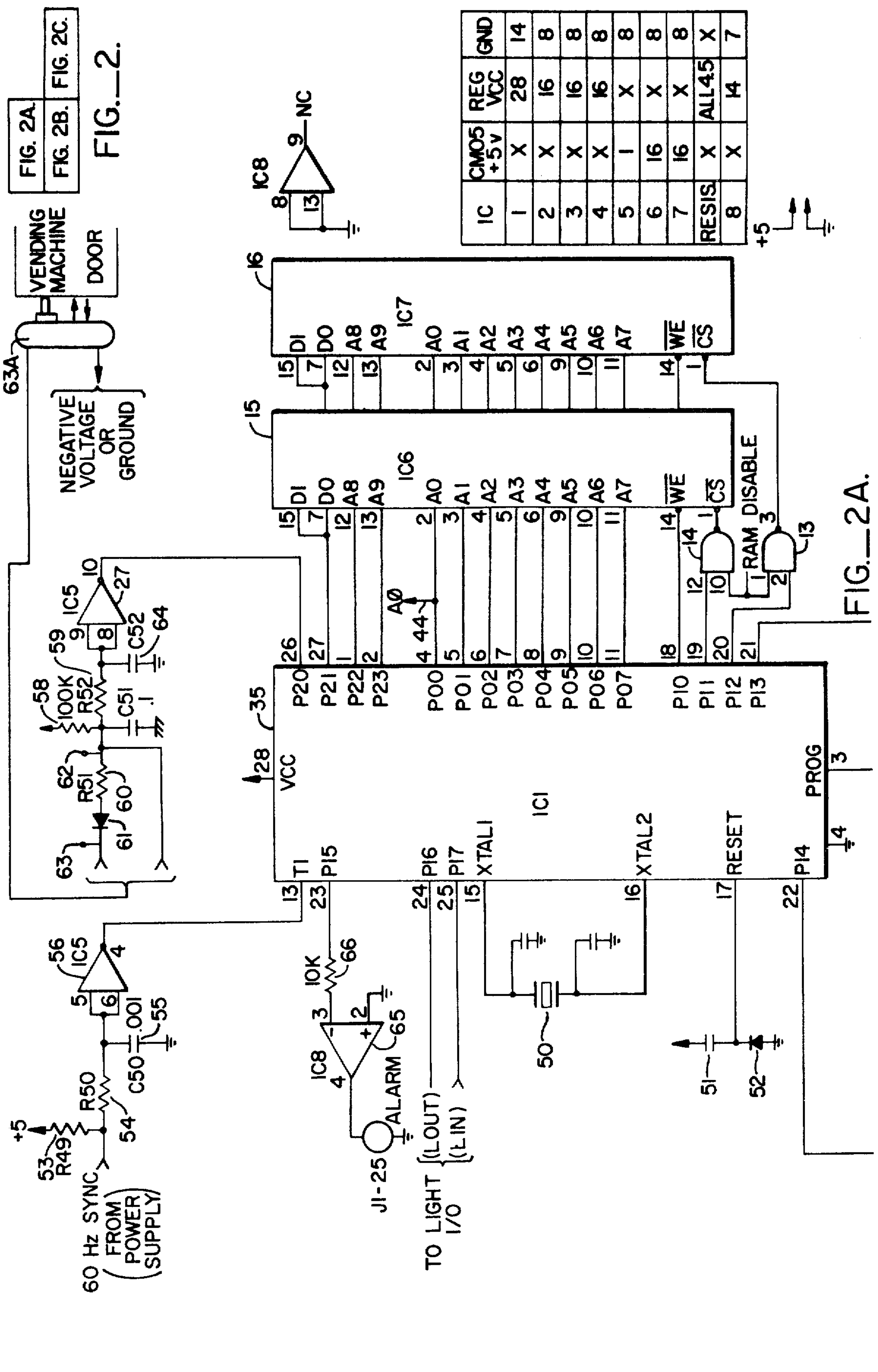
FIG. 2 is a detailed schematic diagram of the data acquisition unit portion of the system according to the invention.
Figure 2B:
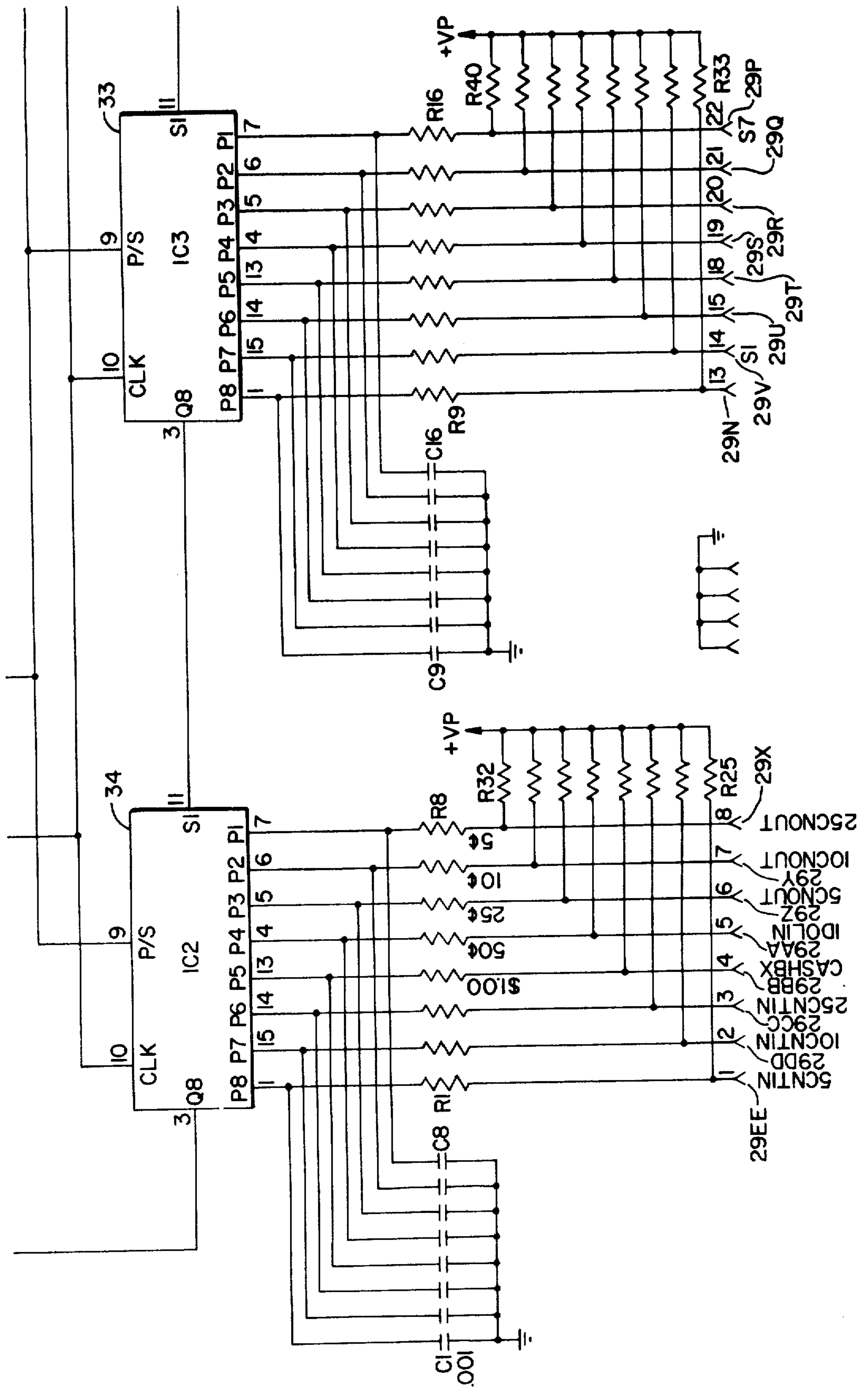
Figure 2C:
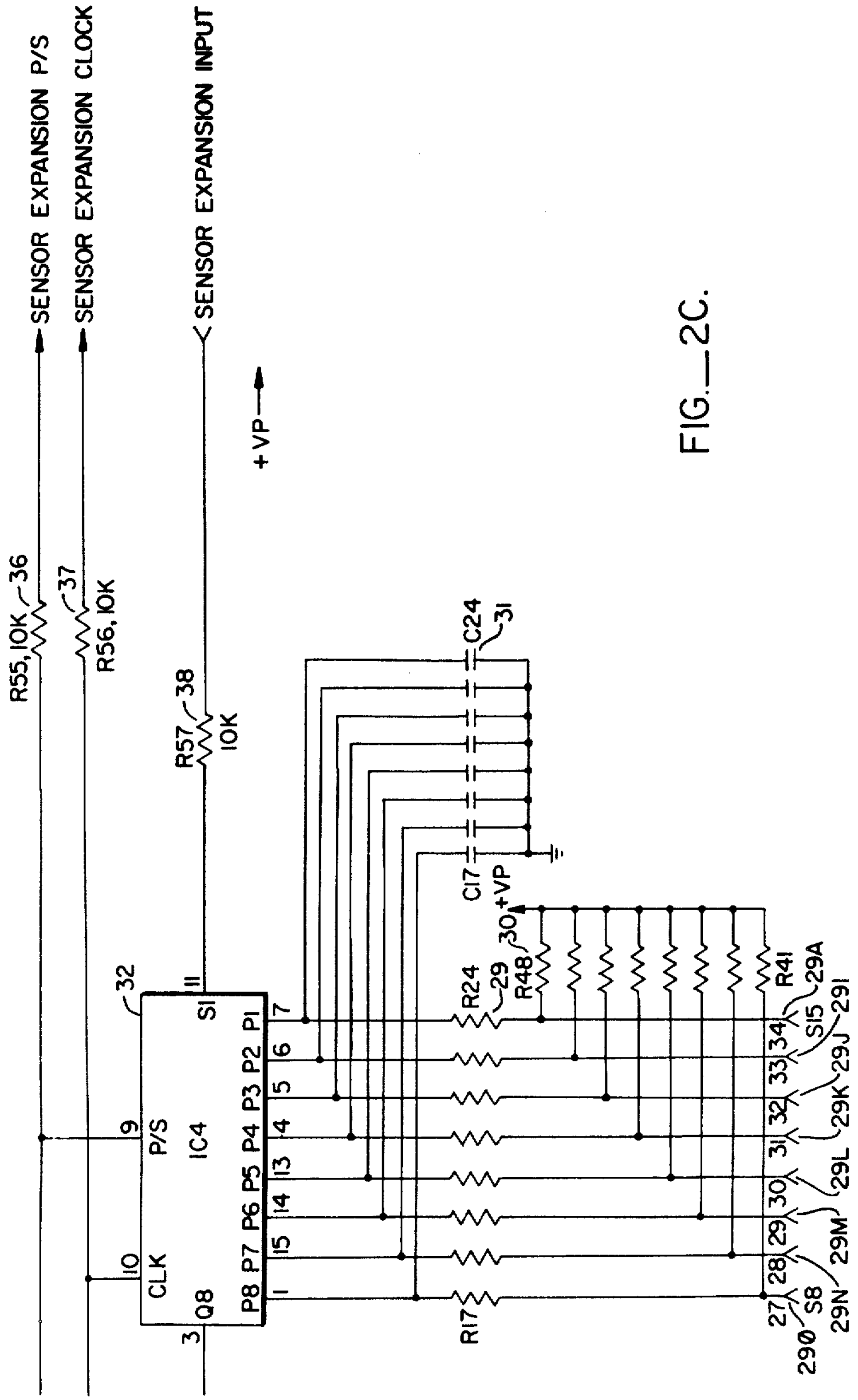
Figure 3:
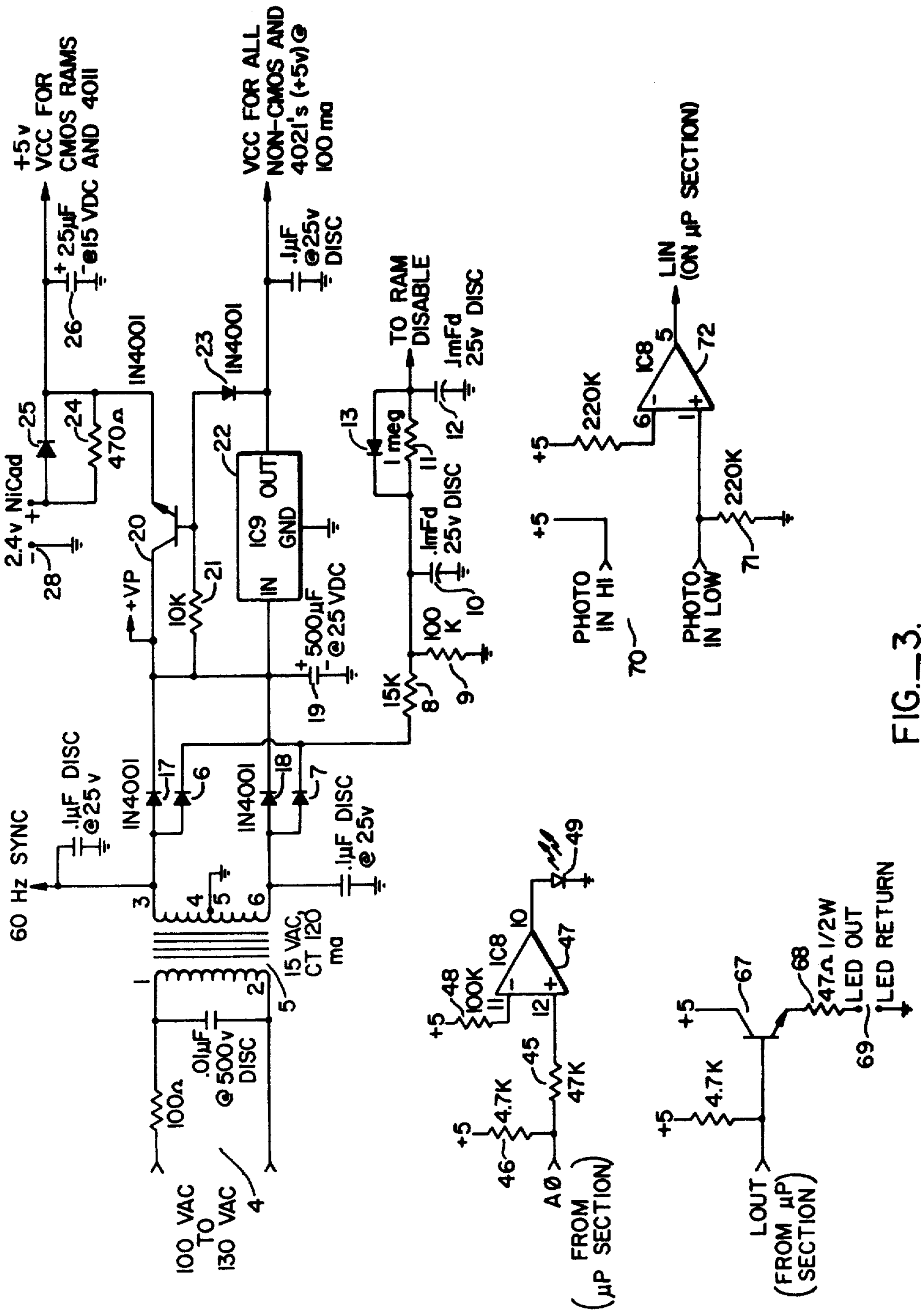
FIG. 3 is a schematic diagram of the power supply system for the data acquisition unit portion of the system.
Figure 4:
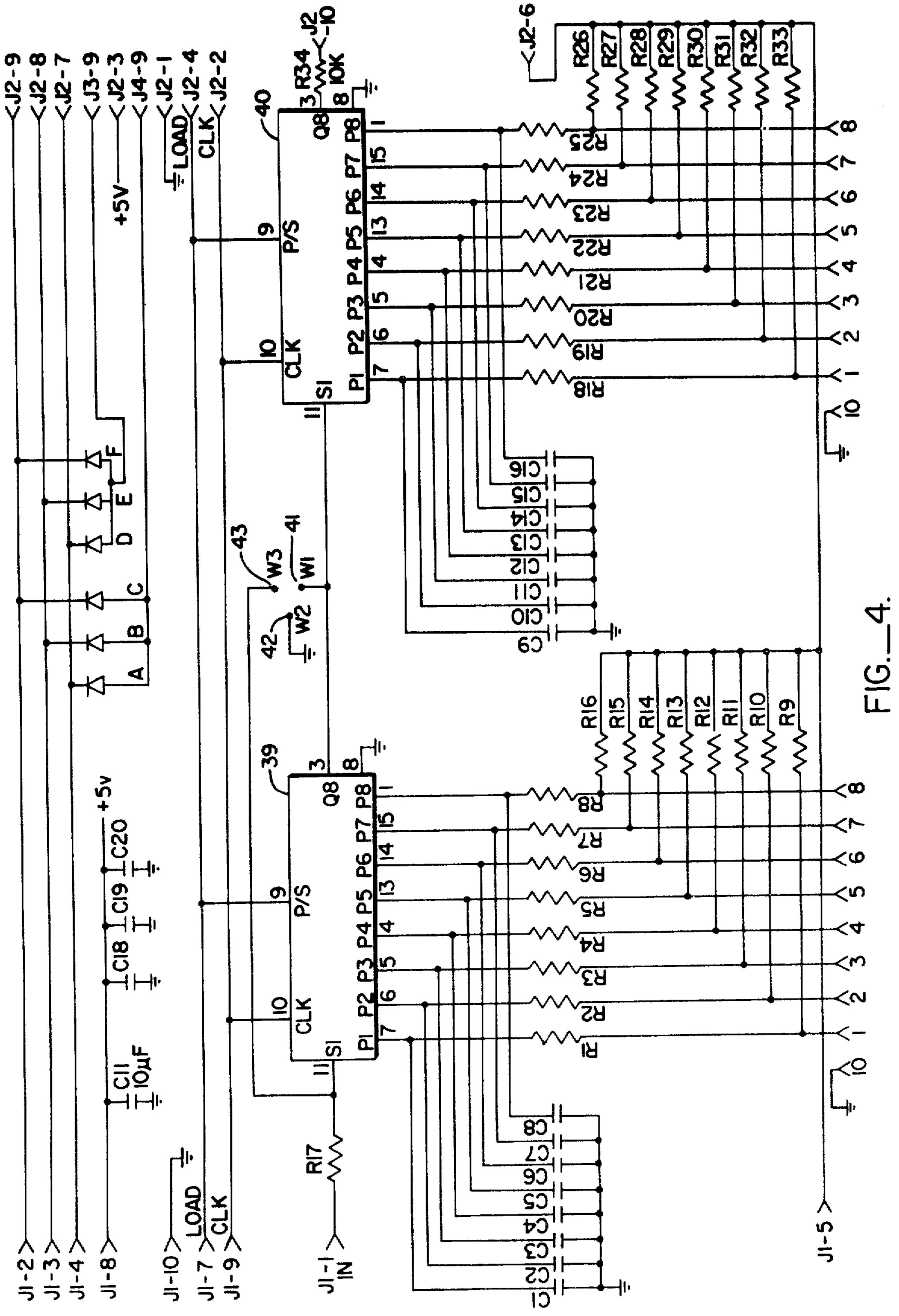
FIG. 4 is a schematic diagram of the expander boards for use with the data acquisition unit portion of the system.

Referring now more particularly to FIGS. 2, 3 and 4, the DAU circuitry will be discussed. The DAU 1 is powered from the vending machine line power 4. A transformer 5 is used to isolate the DAU 1 from the vending machine power line 4. Diodes 6 and 7 form a fullwave rectifier which supplies a 10 volt peak-to-peak signal to one end of resistor 8. The other end of resistor 8 is tied to resistor 9, capacitor 10, resistor 11 and the cathode of diode 13. Resistor 8 and resistor 9 form a voltage divider, and in addition, in conjunction with capacitor 10, act to filter out AC components from the fullwave rectifier signal applied to resistor 8. The resulting DC voltage present at capacitor 10 acts to charge capacitor 12 through the one megohm resistor 11 whenever a signal is present at resistor 8. When the vending machine power 4 is removed at transformer 5 no voltage is applied to resistor 8 through the fullwave rectifier formed by diodes 6 and 7. As a result, capacitor 12 discharges through diode 13 and resistor 9 to ground. Because diode 13 presents a much lower resistance than the one megohm resistor 11, the time to discharge capacitor 12 is contolled by the internal resistance of diode 13 and the value of resistor 9, instead of resistor 11. On the other hand, when a voltage is applied to resistor 8 by the fullwave rectifier, the cathode of diode 13 is at a higher voltage than its anode. Diode 13 is then reversed biased and will not conduct. Thus it can be seen that the value of resistor 11 will control the time required to charge capacitor 12.

The voltage across capacitor 12 is used as a random access memory (RAM) disable signal. As will be explained in greater detail later, a high level at capacitor 12 enables the RAMs 15 and 16 (FIG. 2) while a low level disables the RAMs. For a resistor 9 value of 100 Kohms, a resistor 11 value of one megohm, and a diode 13 internal resistance of a few hundred ohms, it can be seen that the charging time of capacitor 12 will be approximately ten times greater than the discharging time. The significance of this difference is seen by considering the need to disable the RAMs 15,16 quickly when the DAU power is lost, and the need to keep the RAMs disabled long enough for the DAU (microprocessor 35) to stabilize when the vending machine power is reapplied.

The RAM disable signal essentially prevents microprocessor 35 access to the two 1×1K RAM electronic memories 15,16 by presenting a low level to inputs of NAND gates 13 and 14 found in FIG. 2. This causes the outputs of NAND gates 13 and 14 to assume a high level. This "ones" state applied to the chip select port (CS) of RAMs 15 and 16 prevents response by these RAMs to inputs present at any of their other ports.

Returning to FIG. 3, diodes 17 and 18 form a fullwave rectifier whose 10 volt peak-to-peak output is filtered by capacitor 19 and applied to the collector of transistor 20, one end of resistor 21, and the input port of integrated circuit voltage regulator 22. The ground terminal of voltage regulator 22 is tied to chassis ground. The output of voltage regulator 22 supplies 5 volt, 100 milliampere power to all non-CMOS and shift-register integrated circuit components in the DAU. This voltage will henceforth be referred to as REG $V_{cc}$.

Returning to transistor 20 and resistor 21, the base of transistor 20 is tied to the other end of resistor 21 as well as to the anode of diode 23. The cathode of diode 23 is tied to the output of integrated circuit voltage regulator 22. In this configuration, resistor 21, transistor 20, and diode 23 form a voltage follower which allows the emitter of transistor 20 to track the output of integrated circuit voltage regulator 22. The emitter of transistor 20 is tied to one end of resistor 24, the cathode of diode 25, and to capacitor 26. The voltage present of capacitor 26 supplies power for the CMOS RAMs 15 and 16 as well as CMOS inverter 27. Hereinafter, this voltage will be referred to as CMOS $V_{cc}$.

When the vending machine power 4 is removed from the DAU, transistor 20 ceases to conduct. However, battery 28, whose negative terminal is tied to chassis ground and whose positive terminal is tied to the anode of diode 25, conducts through diode 25 to supply the minimum voltage required to maintain all data within the CMOS RAMs 15 and 16. Resistor 24 acts to trickle-charge battery 28 when vending machine power 4 is applied to the DAU.

Returning to FIG. 2, the DAU monitors points such as a coin box sensor, item selection sensors, a door sensor and the like, within the vending machine using a high impedance input circuit which typically takes the form shown by resistors 29 and 30 and capacitor 31. One end each of resistor 29 and 30 is tied to the input of a parallel to serial shift register 32 and to one end of a capacitor 31. The values of resistors 30 and 29 are very large so as to prevent a very high input impedane to the input signal source. The role of capacitor 31 is to filter out any high frequency noise and spiking.

Figure 13:
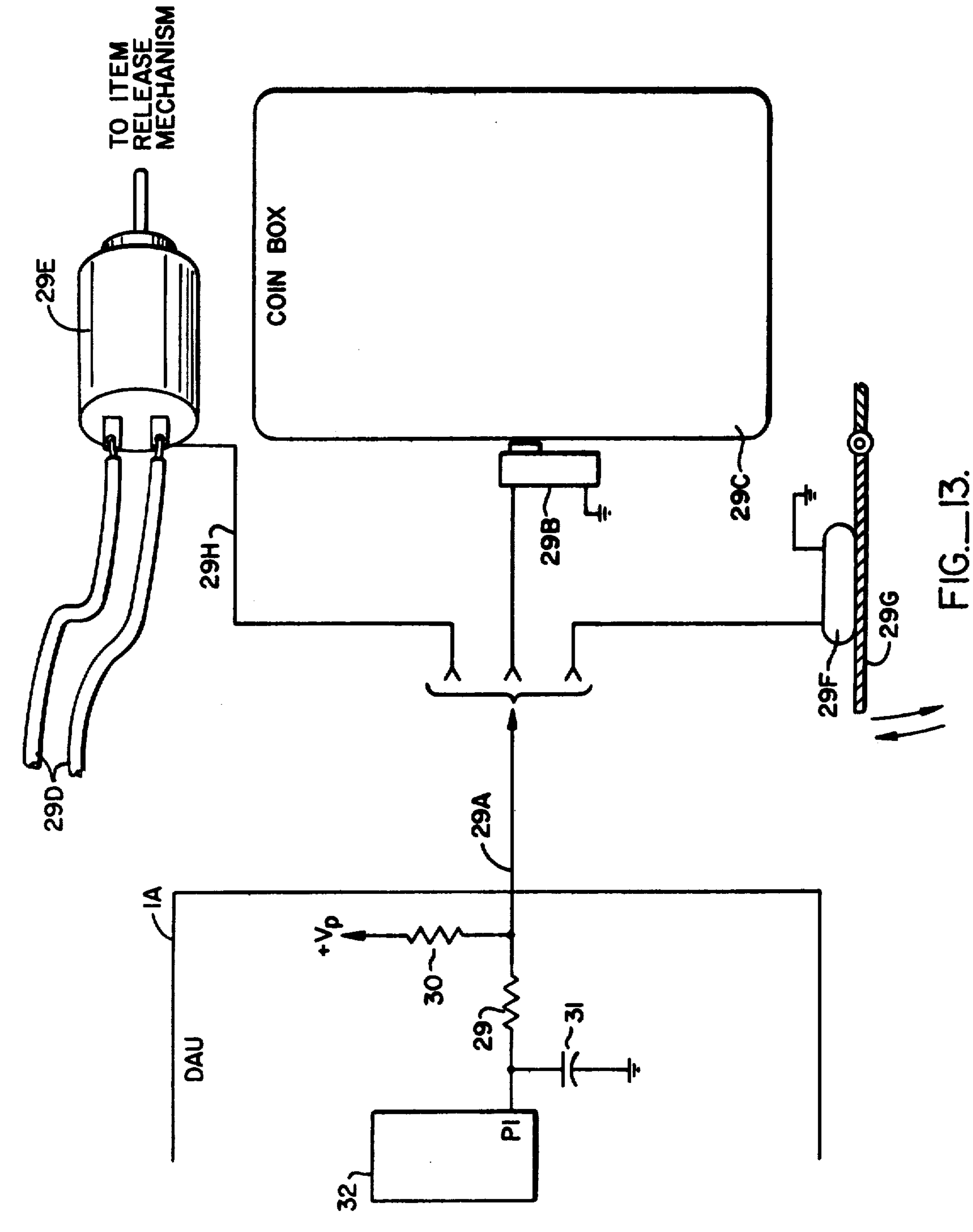
FIG. 13 is a diagrammatic and schematic view of the sensor connections within the vending machine to the DAU.

Referring to FIG. 13, a typical connection to a point within the vending machine is shown. The input signal 29A which is applied to the high impedance input circuit (in this example resistors 30,29 and capacitor 31)

may originate from several sources. These sources include, for example, a contact switch 29B monitoring the coin box 29C presence, an AC signal 29D monitored by line 29H from the activation of an electric motor 29E which operates an item release mechanism, or a motion detecting switch 29F which detects the movement of a chute door 29G when an item is released. Other typical input conditions monitored by lines 29A, 29I-Z, 29AA-29EE, include reed switch closures to ground, a DC voltage, or an AC voltage.

In a similar manner, the other monitored signals are inputted to each of the parallel data lines $P_1$ through $P_8$ of parallel to shift serial registers 32, 33 and 34. The serial output line of shift register 32 is connected to the serial input line of shift register 33. Likewise the output of shift register 33 is connected to the serial input line of shift register 34. The serial output line of shift register 34 is connected to input line $P_{14}$ of the microprocessor 35. In this manner, data contained in shift register 32 may be shifted serially out of shift register 32 into register 33; then out of register 33 to register 34; and then out of register 34 into microprocessor 35. Thus all information contained within the parallel to serial shift registers may be shifted out of them, in serial form, into the microprocessor 35. Data at the parallel inputs of shift registers 32, 33 and 34 are loaded into these registers when the pulse/strobe line (P/S) for each register is strobed by the microprocessor 35. Microprocessor 35 pin $P_{13}$ is utilized to perform this strobing operation. Microprocessor 35 pin PROG provides a clock signal to the clock inputs of the shift registers 32, 33 and 34, and is used to clock the serial data out of the shift registers into the microprocessor 35.

The P/S signal, pin 13 of microprocessor 35, is brought out to an expansion connector through resistor 36. Likewise, the clock signal, pin PROG of microprocessor 35, is brought out to the expansion connector through resistor 37. Similarly, an input into the serial input pin of shift register 32 is provided at the extension connector through resistor 38. Also included at the expansion connector is REG $V_{cc}$, chassis ground, and $V_p$. This extension connector allows the DAU to be expanded to monitor 32 additional data points, i.e., the sensors in a bank of vending machines, through the use of two expander boards, one of which is shown in FIG. 4.

Moving to FIG. 4, the expander board consists of two shift registers 39 and 40 with associated circuitry virtually identical to that of shift registers 32, 33 and 34. Also included, however, is the provision which allows the serial output of the expander board to either bypass the data within shift register 39, to include the data within register 39, or to output no data at all. This is accomplished by wiring a jumper between points 43 and 41, or between points 42 and 43, or by having no jumpers at all.

Returning to FIG. 2, the microprocessor 35, which has no provision for an expansion memory, is used in conjunction with RAMs 15 and 16 so that a 1×2k RAM expansion memory is implemented. The microprocessor 35 addresses the expansion memory through its pins $P_{00}$ through $P_{07}$, $P_{22}$ and $P_{23}$. The 1×2k RAM is addressed through pins $A_0$ through $A_9$ of RAMs 15 and 16. Data are input and output from the 1×2k RAM in serial form through pins DI and DO of RAMs 15 and 16. Serial data from the 1×2k RAM are received by the microprocessor 35 through pin $P_{21}$. The line 44 connecting pin $P_{00}$ of microprocessor 35 to pin $A_0$ of RAM 15 is also connected to one end of resistor 45 and resistor 46 found in FIG. 3. The other end of resistor 46 is tied to REG $V_{cc}$, and the other end of resistor 45 is tied to the positive input, pin 12, of integrated circuit current amplifier 47. The negative input of current amplifier 47, pin 11, is tied to REG $V_{cc}$ and to resistor 48. Current amplifier 47 amplifies the difference between the current flowing through resistor 45 into pin 12 and the current flowing through resistor 48 into pin 11 of current amplifier 47. This difference is determined by the signal present on the line connecting port $P_{00}$ of microprocessor 35 and port $A_{00}$ of RAM 15 which is transmitted to the current amplifier through resistor 45.

The resulting current differences, amplified by current amplifier 47, are applied to the anode of light emitting diode 49. The cathode of light emitting diode 49 is tied to ground. As a result, the signals transmitted between the microprocessor 35 and RAM are transformed by the current amplifier 47 into a visual indication. This visual indication is used by technicians when trouble shooting the DAU to verify proper functioning of the microprocessor 35 and RAM expansion memory.

The 1×2k random access memory (RAM) consists of two 1×1k RAMs and 15 and 16. The microprocessor 35 selects between RAM 15 or 16 by outputting a logic one voltage level from port $P_{11}$ of microprocessor 35 if RAM 15 is desired, or a logic one voltage level out of port $P_{12}$ of microprocessor 35 if RAM 16 is desired. These logic one voltage levels are transmitted to the chip select inputs of RAMs 15 and 16 through NAND gates 13 and 14. The chip select signal from microprocessor 35 port $P_{11}$ is connected to one input of NAND gate 14. The other input is connected to the RAM disable command from the power supply found in FIG. 3 at the junction of diode 13, resistor 11 and capacitor 12. The output of NAND gate 14 is connected to the chip select input of RAM 15. When the DAU is on, that is when vending machine power is applied to the DAU, the RAM's disable line is high.

The logic one voltage applied to the microprocessor 35 from port $P_{11}$ causes the output of NAND gate 14 to assume a low state. This low state at the chip select input to RAM 15 causes the RAM 15 circuitry to respond to signals present at other ports. When power is removed from the power supply, the RAM disable signal NAND gate 14 goes to a low state. As a result of this, the output of NAND gate 14 will be a high state which will remain the same regardless of the voltage level at the other input which comes from port $P_{11}$ of microprocessor 35.

When a high level is applied to the chip select port of RAM 15, RAM 15 circuitry will not respond to the signals present at its other ports. Microprocessor 35 writes data into the expansion memory which is present at ports DI and DO of RAM 15 and RAM 16 by applying low voltage to the write enabled port of RAM 15 and RAM 16. This low voltage is applied from port $P_{10}$ of microprocessor 35.

Returning to FIG. 2 and microprocessor 35, crystal 50, one end of which is connected to pin XTAL1 and the other end to pin XTAL2 of microprocessor 35, determines the 3.58 MHz clock frequency of the microprocessor. Capacitor 51 and diode 52 form a power-on detection circuit to reset microprocessor 35 in the event that vending machine power is lost and then later reapplied. The positive terminal of capacitor 51 is connected to REG $V_{cc}$ and the negative terminal of capacitor 51 is tied to the RESET pin of microprocessor 35 and the cathode diode 52. The anode of diode 52 is tied to ground. When power is reapplied to the DAU from an "off" state, capacitor 51 allows the edge of the off-to-on power transition to pass through and be applied to RESET pin of microprocessor 35. This, in turn, signals the microprocessor to reset its internal circuitry. Diode 52 acts to shunt any negative-going signals at RESET pin of microprocessor 35 to ground. Diode 52 also provides a discharge path for the voltage across capacitor 51 when vending machine power is removed from the DAU.

Port $T_1$ of microprocessor 35 monitors the frequency of the vending machine power supply through buffering circuitry formed by resistor 53 and resistor 54, capacitor 55 and integrated circuit inverter 56. One end of resistor 53 is tied to REG $V_{cc}$, its other end is tied to one end of resistor 54 and to 5A (Pin 3 of the secondary of transformer 5 found in FIG. 3). The other end of resistor 54 is tied to one end of capacitor 55 and input pins 5 and 6 of inverter 56. By tying R53 to REG $V_{cc}$, the AC waveform found at the junction of R53 and R54 is offset from ground so that the maximum and the minimum peaks of the waveform are above ground. The large values of R53 and R54 present a very high input impedance to the secondary of transformer 5. The capacitor 55 filters out any high frequency spiking. Inverter 56 acts to limit the level of the AC signal to values between ground and REG $V_{cc}$ (the power supply voltage to inverter 56).

The state of the door, i.e., opened or closed, of the vending machine is monitored through buffering circuitry by pin $P_{20}$ of microprocessor 35. The buffering circuitry is similar to that of the line frequency buffer just described, but also includes provisions to monitor various levels of voltages to indicate door opened or door closed. Resistor 60, diode 61, and jumper points 62 and 63 allow alteration for different input levels. When there is no connection between jumper points 62 and 63, the cathode of diode 61 is tied to the point being monitored. The anode of diode 61 is tied to one end of resistor 60 and the other end of resistor 60 is tied to the basic buffering circuit.

The basic buffering circuit consists of resistor 58, resistor 59, integrated circuit inverter 27 and capacitor 64. As before, the connection of resistor 58 to regulated $V_{cc}$ acts to offset the input voltage slightly from ground. The combination of resistors 58 and 59 provides a high input impedance to the inputs signal while capacitor 64 filters out the high frequency spiking. The inverter 27 limits and inverts the input signal. The signal applied to the junction of resistors 58 and 59 is determined by the configuration of diode 61, resistor 60 and jumper points 62 and 63. A door sensor switch 63A is connected to either point 62 or point 63 depending upon the voltage level available for use as an input signal. If a large negative level is available, the switch 63A is connected to point 63, and the other end of the switch is connected to that negative voltage source. If a switch closure to ground is used, the switch 63A is connected to point 62, with the other end to ground.

When there is no connection between jumper points 62 and 63, a connection at the point being monitored to a large negative voltage will cause current to flow through resisor 60 and diode 61. This effectively forms a voltage divider formed by reistor 58 and resistor 60. The resulting voltage presented to the junction of 58 and 59 will then be about zero volts, versus REG $V_{cc}$ when the point being monitored is floating. When a jumper is tied between points 62 and 63, and when the point being monitored is grounded, the voltage present at the junction of resistor 60 and resistor 59 is 0 volts. In both cases above, when the negative voltage or ground is present, the output of inverter 27 will be at REG $V_{cc}$. On the other hand, when no connection is present, REG $V_{cc}$ will be applied to the input of inverter 27 and its output will be at 0 volts, When the microprocessor determines (programming to be described infra.) that an entry into the vending machine is unauthorized or has been made without interrogating the DAU, it outputs a signal at pin $P_{15}$. This signal is then transmitted to integrated circuit current amplifier 65 through resistor 66. In response to this signal current amplifier 65 produces the amplified signal at its output. The output of current amplifier 65 is tied to an audio alarm. In response to the output of current amplifier 65, the audio alarm is sounded.

Figure 5:
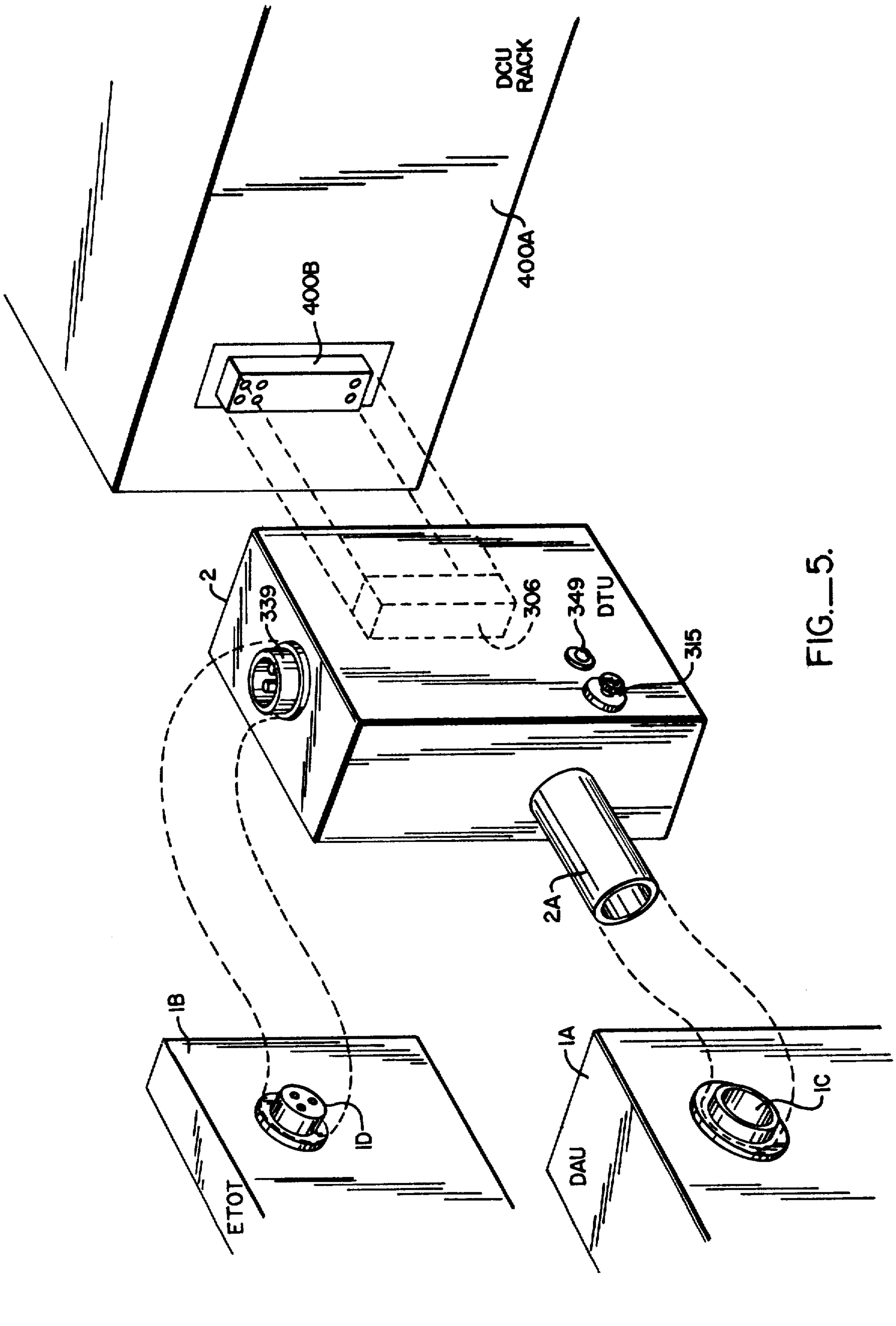
FIG. 5 is a perspective view, illustrating the coupling of the DTU to the DAU, ETOT and DCU.

The DAU communicates with the DTU through an optical link. Referring to FIG. 5, the interconnection between the DAU and the DTU is shown. The interconnection is facilitated through the use of a flexible tube 2A which is attached to the DTU 2 chassis. At the DTU 2 chassis, the tube 2A encases DTU phototransistor 354 and LED 360, which are mounted on the DTU chassis. Upon interrogation of the DAU by the DTU, the route person slips the free end of tube 2A over lens 1C, located on the DAU 1A chassis. (Beneath lens 1C is located DAU phototransistor 70 and LED 69.) The tube 2A thus forms a sealed optical path between the DTU input/output and the DAU input and output.

The output signal of the DAU originates at pin $P_{16}$ of microprocessor 35. Pin $P_{16}$ is then tied to the base of transistor 67, the emitter of transistor 67 is connected to the anode of an infrared light emitting diode 69 through resistor 68. The cathode of LED 69 is tied to chassis ground. The body of LED 69 is located on the chassis of the DAU. Transistor 67 is used in a voltage follower configuration and supplies current amplification for the output signal from pin $P_{16}$ of the microprocessor.

Pin $P_{17}$ of microprocessor 35 receives input information from the DTU through a phototransistor current amplifier link. Basically the DTU transmits optical information which is incident upon the base of phototransistor 70. The collector of phototransistor 70 is tied to REG $V_{cc}$ and the emitter of transistor 70 is tied to resistor 71 and the positive input to current amplifier 72. The phototransistor operates to convert light signals incident on its base, into a current signal out of its emitter. This current signal is then amplified by current amplifier 72 whose output is then connected to pin $P_{17}$ of the microprocessor 35.

Figure 14:
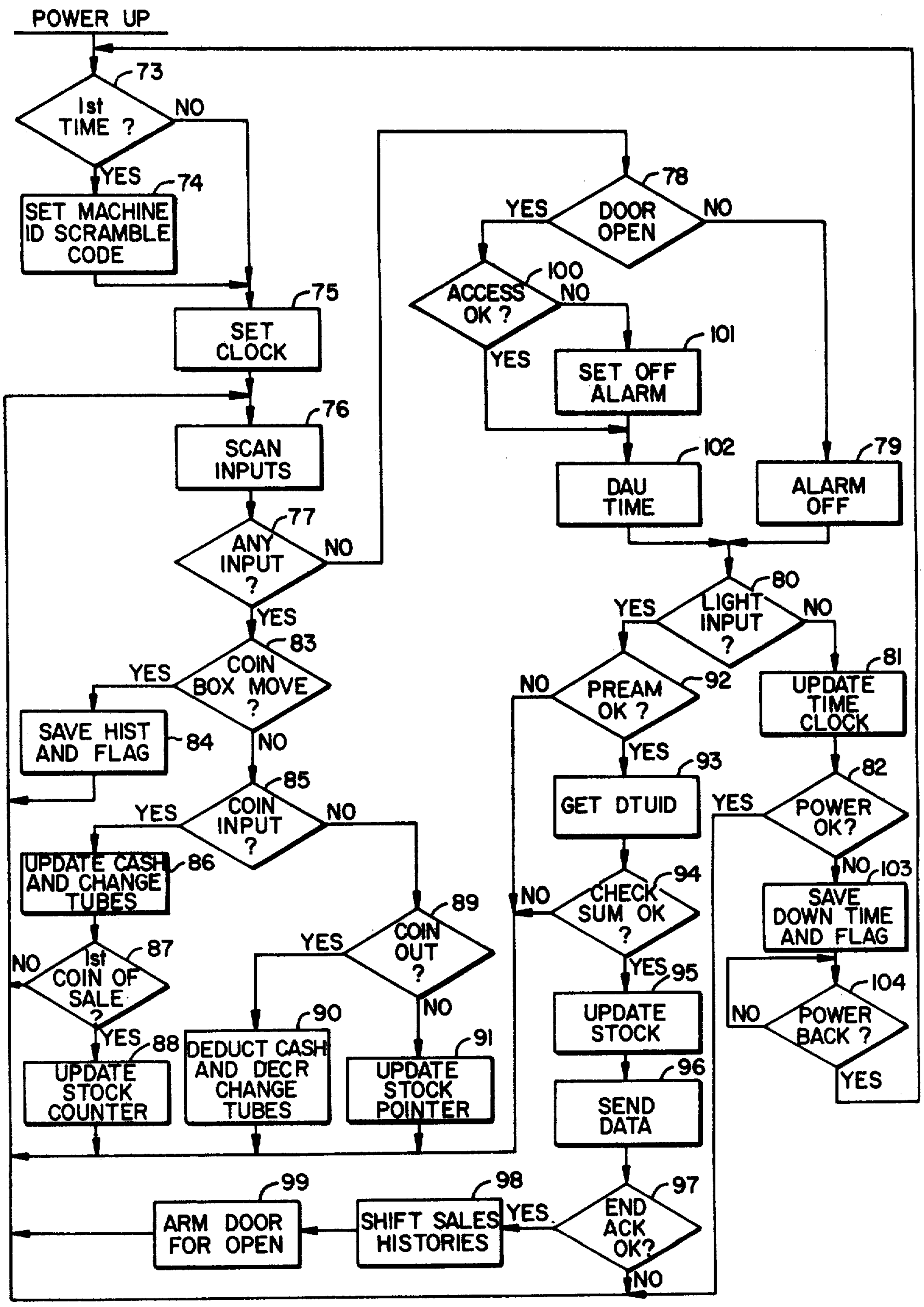
FIG. 14 is a flow chart diagram for use in explaining the operation of the data acquisition unit portion of the system, according to the invention.

Referring now to FIGS. 2, 4 and 14, the typical operation of the DAU will be described. As can be seen from FIG. 14, microprocessor 35 is programmed to execute a continuous loop. Prior to entering this loop, step 73 involves a determination of whether the DAU is being powered up for the first time. This is determined when the microprocessor examines the last bit of the serial data from the shift registers (e.g., 34, 33 and 32).

In normal operation the last bit of the serial data stream is tied high. However, when the DAU is first powered up, DAU ID and scramble code data must be programmed into the microprocessor. This is accomplished by connecting a portable programming unit to the input lines in place of the expander boards shown in FIG. 4. This programming unit provides a serial data stream with its last bit tied low. This low state tells the microprocessor 35 that DAU ID, machine type, and scramble code information, are contained within the data stream. This also tells the microprocessor 35 that the information is sought to be programmed into the DAU. In step 74, the microprocessor treats the first 16 bits of this programming data stream as Machine Type and Machine ID information. The next 8 bits are treated as the scramble code. After the execution of step 74, the microprocessor proeeds to step 75 in which the DAU clock is initialized. If, on the other hand, in step 73 the last data bit is low, indicating normal operation, the microprocessor proceeds directly to step 75 and sets the DAU clock.

The DAU clock consists of a running count of the number of scan loops that the microprocessor has executed. The least significant bit of the counter corresponds to $2^{16}/80$ seconds (approximately 13,653 minutes).

The microprocessor scan loop begins at step 76. In this step, the microprocessor scans all of its inputs, noting any changes, and updating its records accordingly. In step 77 the microprocessor looks at various sensor inputs previously described to see if there have been any coins accepted (e.g., lines 29BB–29EE), coins returned (e.g., lines 29X–29Z), whether the coin box has been moved (e.g., line 29AA), or whether any of the monitored items have been sold (e.g., lines 29A, 29I–29W). These inputs are examined by the microprocessor by outputting a high level from pin $P_{13}$ of microprocessor 35 so as to strobe the parallel input lines (29A, 29I–29Z, 29AA–29EE) of shift registers 33, 34 and 32.

This strobe command causes any input levels present at any of the shift register parallel input pins (e.g., lines 29A, 29I–29Z, 29AA–29EE) to be loaded into the shift registers. Once the parallel data has been loaded into the shift registers, a clock signal from pin PROG of microprocessor 35 is used to clock the data out of the shift registers in serial form into pin $P_{14}$ of the microprocessor 35. These data input bits may be in the form of DC voltage levels, switch closures to ground, or the absence or presence of an AC voltage (where the source of such AC voltage is the 60 Hz, 110 volt line power to the vending machine). Because of this great flexibility of acceptance of different types of sensor inputs, the system of the present invention can be easily retrofitted to all types of existing vending machines.

The DAU is able to distinguish these three types of sensor input signals through internal processing. This processing will now be described in more detail. As indicated previously, microprocessor 35 provides a strobe input to the parallel to serial shift registers which causes the shift registers to load the input levels present at their parallel inputs. This strobe signal is synchronized with the 60 Hz SYNC signal 5A, presented to pin $T_1$ of microprocessor 35. Microprocessor 35 locks to the zero crossings of the 60 Hz SYNC signal 5A and outputs a strobe signal at pin $P_{13}$ when it determines that either a positive peak or negative peak of the SYNC signal 5A has been reached.

Thus it can be seen that the input levels present at the parallel input pins to the shift registers, if they are AC levels, will be at their most positive or most negative levels. It may also be seen that if samples are taken on two consecutive peaks of the SYNC signal 5A, the input will exhibit a change from a low to high level or a high to low level if it is an AC input signal. If in two sampling sets the microprocessor 35 detects high to low or low to high transitions, the input signal is treated as an AC signal. If, on the other hand, two sets of transitions are not found the microprocessor treats the single transition that was found as a transient condition and therefore treats the input signal as a DC level or switch closure to ground.

Returning now to FIG. 14 and step 77, if no new inputs within the serial data chain are detected, the microprocessor 35 proceeds to step 78 in which it examines the door open signal from sensor 63A at microprocessor pin $P_{20}$. If the door has not been opened the microprocessor proceeds to step 79 and disables the audio alarm. It then proceeds to step 80 in which the microprocessor pin $P_{17}$ is examined for the presence of a DTU interrogating signal. If no interrogating signal is found, the microprocessor 35 proceeds to step 81 in which it updates the DAU clock. This update indicates that the DAU has completed one scan loop. In the next step 82 the microprocessor 35 checks to see that the power applied to the DAU is still present. If the power is present, the microprocessor 35 completes the loop by returning to step 76 and resumes scanning inputs.

During a scan loop, the microprocessor 35 scans, step 77, the input sensor levels obtained (from 29A, 29I–29Z, 29AA–29EE) through shift registers 32, 33 and 34, and corresponding input circuits, typified by the combination of resistors 29 and 30 and capacitor 31. These input sensor levels correspond to coin box state 29AA, nickels in 29EE, dimes in 29DD, quarters in 29CC, dollars in 29BB, quarters out in 29Z, dimes out in 29Y, nickels out in 29X, and stock columns 29I–29V. When a transaction occurs, the customer must first insert the appropriate number of coins. The customer then selects the desired item, the item is delivered to the customer, and change, if any, is returned. Thus, it may be seen that for any transaction there are potentially three types of inputs that the microprocessor is monitoring: coins in, coins out, or stock column change. For this reason, in steps 85 and 89, the microprocessor 35 looks to the coins in and coins out inputs. In step 91, the microprocessor 35 maintains a stock pointer to keep track, during an input scan loop (i.e., 76→83→85→89→91→76), of the particular stock column input corresponding to the item sold to the customer during the particular transaction. The information maintained in step 91 is used in step 88 to update the count of the number of sales of that particular item.

In step 77, when an input is detected, the microprocessor 35 examines whether or not the coin box has been moved, as indicated by sensor 29B. If the coin box has been moved, the microprocessor 35 proceeds to step 84 in which it makes a notation in the coin box moved record that the coin box has been moved. In this way a record is maintained, for accounting and security purposes, of the number of times the cash box was touched. The microprocessor 35 then returns to step 76.

If, on the other hand, the coin box was not moved in step 83, the next step would be step 85 in which the microprocessor 35 determines whether there has been a coin input, as detected by sensors 29BB–29EE. If there was a coin input (as detected by sensors 29BB–29EE), as indicated by the corresponding data bit in the serial data chain from the parallel to serial shift registers, the microprocessor 35 proceeds to step 86 in which the change tube levels are updated.

By maintaining a record of the change tube levels, a determination of the amount of sales made by the vending machine may be calculated without the need to calculate (and record) the monetary value for each item sold, at the time it is sold. Instead, the microprocessor 35 maintains a record of the change tube levels and a sales history. From this information sales totals may be calculated, as described in the DCU detailed description.

In step 87, the first coin of a sale is used to update the item count record in step 88. If the coin that is received in step 85 is not the first coin of the sale, the microprocessor 35 returns to step 76 and loops through steps 83, 85, 86 and 87 until no further coins are received.

If, in step 85, a coin input was not received, the microprocessor 35 proceeds to step 89 in which a determination is made as to whether any coins have been returned as change. If any coins have been returned, the microprocessor 35 proceeds to step 90 in which the change tube level record and cash record are updated. After step 90, the microprocessor returns to scan inputs step 76. If, in step 89, no coins were returned, the next step, step 91, would update the pointer in the microprocessor program which points to the particular item that was the subject of the sale and, in conjunction with step 88, updates the item count for the particular stock column. Once the stock pointer has been updated, the microprocessor 35 returns to step 76.

Figure 15:
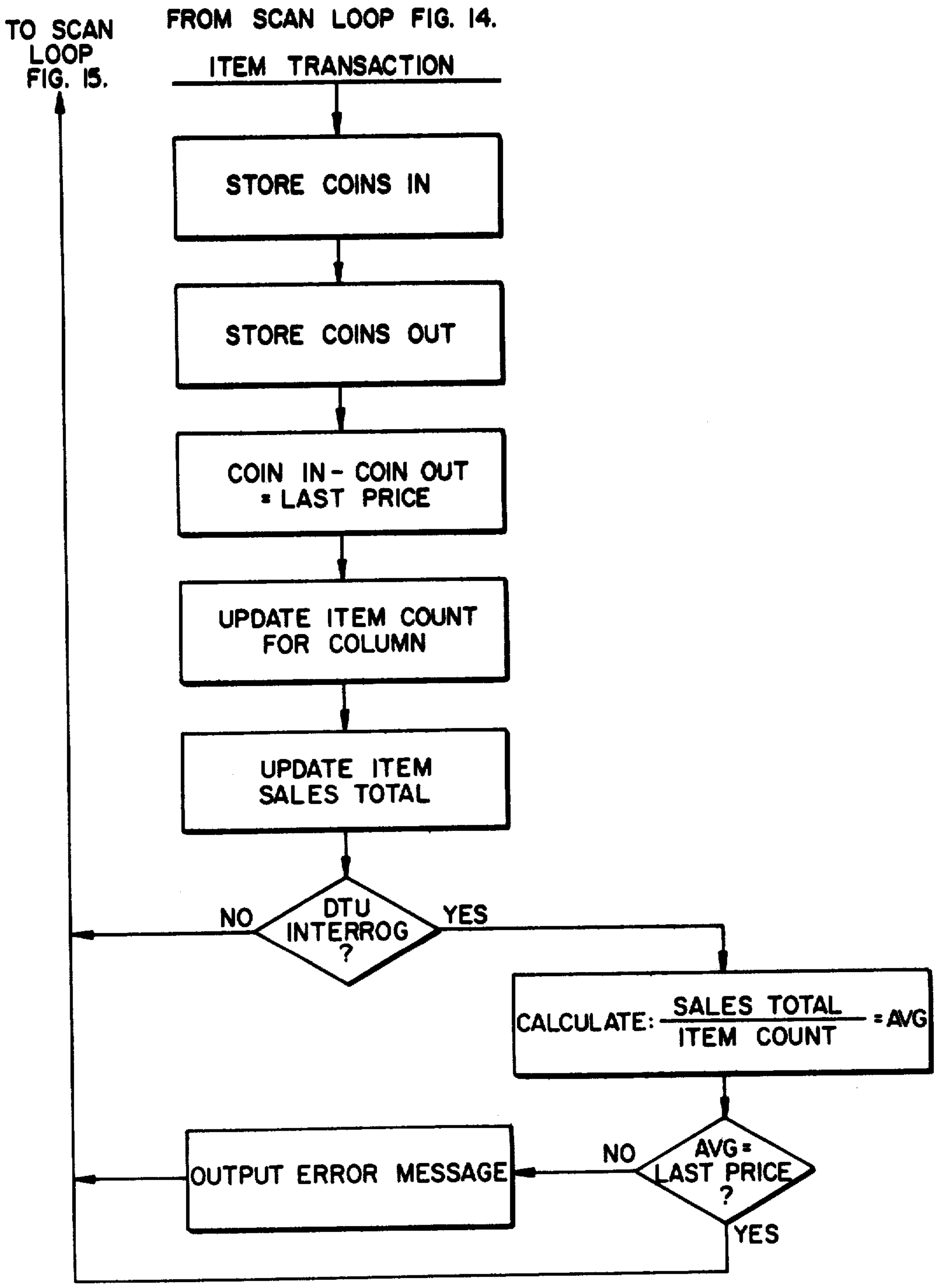
FIG. 15 is a flow chart diagram for use in explaining the operation of a modified embodiment of the data acquisition unit portion of the system, according to the invention.

Because a microprocessor 35 is used to control the DAU, there are a multitude of variations of record keeping and data manipulation that can be implemented in the DAU by a mere programming change. For example, the DAU can be programmed to perform more complex or additional calculations, or the DAU can be programmed to store different groupings of the data being monitored. The cash accounting procedure just described can be modified by program change so that errors in the change mechanism or vending mechanism can be detected. Such can be implemented by maintenance of a record of 1) the total number of items sold per column during the specified period, 2) the total amount of sales for the column during the period, and 3) the difference between the coins in and coins out for the last item vended from the column. FIG. 15 illustrates a typical sequence of steps that are used to implement this error detection. By comparing the ratio of the total sales of the item and the total number of the item sold (average price per item) to the last vended price of the item (difference between coins in and coins out) a non-zero difference between the two indicates either a coin mechanism error or a vending error.

If in step 80 an interrogating light input from a DTU is present at microprocessor pin $P_{17}$, the microprocessor 35 checks to see that the preamble being sent by the DTU is correct. If it is not correct, the microprocessor 35 returns to step 76, thus preventing unauthorized entry by one who does not have access to the proper "shake hands" program. If the preamble is correct, the microprocessor 35 in step 93 retrieves the DTU ID. Thus, where a "shake hands" routine is obtained by an unauthorized person, the ID of the DTU being used is nonetheless recorded by the DAU and is available for identifying the unauthorized DTU.

In step 94 the microprocessor 35 verifies that the communication link is sound by evaluating checksums. If the checksums are incorrect, the microprocessor 35 returns to step 76. On the other hand, if the checksums are correct, the microprocessor 35 updates its stock counters at step 95, and then in step 96 transmits the data contained in external memory to the DTU. The data are transmitted in encoded form so as to be meaningless to the unauthorized interrogator.

When this data transmission is complete, the DAU receives an acknowledgement from the DTU of such fact. If no acknowledgement is received, microprocessor 35 returns to step 76. If the transmission was successful, the DAU then proceeds to step 98 in which it updates the various sales and access histories that it maintains.

The maintenance of sales coin and access histories in the DAU is necessary because the DCU has no mass storage. Therefore, any calculation made by the DCU is based upon current and historical information provided by the DAU. The maintenance of sales, coin and access histories is important (1) because of the technique utilized by the DCU in calculating total sales, described in the DCU detailed description, infra., and (2) because with such information, greater inventory and accounting control may be maintained.

The microprocessor 35 now proceeds to step 99 in which it arms the door in preparation for an opening by the route person. The microprocessor 35 then returns to step 76 and continues scanning the inputs. In step 78, when the door is opened, the microprocessor 35 checks, in step 100, whether or not the access is authorized. The access is authorized if, prior to opening the door, a DTU has properly interrogated the DAU. It the access is not authorized, an audio alarm is set off at step 101. If the aaccess is authorized no alarm is sounded. In either case, the microprocessor 35 records the DAU time at which the door was opened and also whether or not it was an alarmed opening—step 102. Once the time record is made, microprocessor 35 proceeds to step 80 to determine whether an interrogating DTU is present.

If in step 82 microprocessor 35 determines that the DAU power is being removed, it proceeds to step 103 and saves the DAU time and makes a notation that the DAU power is being removed. It then proceeds to step 104 in which it remains until DAU power is reapplied. When DAU power is reapplied, the microprocessor 35 returns to step 73 initialization process.

In step 96, when the DAU sends the data contained in its external memory to the DTU, the data are first encoded by exclusive OR ing the data with the scramble code.

The serial data that are transmitted to the DTU are arranged in the following format. The first byte, byte 0, is the DAU flag and consists of all zeros. Byte 1 is nonzero if an exception was detected by the DTU during the DAU interrogation. Bytes 2,3 contain the ID of the DTU that is interrogating the DAU. Bytes 4,5 contain the DTU time at which the interrogation occurred.

Bytes 6,7 contain the DAU time at which the interrogation occurred. Bytes 8 through 15 contain the IDs of the last four DTUs which interrogated the DAU, with bytes 8 and 9 containing the ID of the most recent DTU, and bytes 14 and 15 containing the ID of the least recent DTU. Bytes 16 through 23 contain the DTU times of the four most recent DTUs to interrogate the DTU with bytes 16,17 containing the most recent DTU time and bytes 22,23 containing the least recent DTU time. Bytes 24,25 contain a count of the number of times the DAU door has been opened since the DAU was initially powered up. Bytes 26,27 contain the number of times the DAU has been accessed by a DTU since the DAU was first powered up.

Bytes 28,29 contain 0 since this is the scramble code which has been XOR'd with itself. Bytes 30,31 contain the DAU time at which the last power down of the DAU occurred. Bytes 32,33 contain the DAU ID with the most significant nibble (four bits) indicating the machine type. Byte 34 contains a record of whether the coin box was touched in the last eight accesses to the vending machine. A "one" in the bit 0 position indicates that eight accesses ago the coin box was touched, while a "one" in the bit 7 position indicates that, on the last access, the coin box was removed. Byte 35 contains a record of whether, in the last eight vending machine accesses, any of those accesses were alarmed accesses (i.e., access to the machine without first properly interrogating the DAU). A "one" indicates an alarmed access, and bit 0 corresponds to the least recent access.

Bytes 36 through 43 contain the DAU times of the last four door openings, the time of the most recent opening contained in bytes 36, 37 and least recent time in bytes 42,43. Bytes 44,45 contain the amount of total product sales at the time of the last cash box collection expressed in an equivalent number of nickels. This total is a running total and is not reset by a DTU access to the DAU. Bytes 46 through 48 contain the levels of the change tubes at the last cash box collection. Byte 46 corresponds to the nickel change tube level, byte 47 corresponds to the dime change tube level, and byte 48 corresponds to the quarter change tube level. The change tube levels are tracked from a full state. Bytes 49,50 contain a running count, in nickel equivalents, of the total amount of cash accepted by the machine.

Bytes 51,52 contain a running count, in nickel equivalents, of the total change returned by the machine. Bytes 53 through 67 contain a history of the change tube levels at the four previous accesses to the DAU. Byte 56 corresponds to the level of the nickel change tube at the most recent access; byte 67 to the level of the quarter change tube at the least recent access. Bytes 68 through 71 contain sales histories computed for the last four accesses. A sales history is the difference between the ACCEPTED TOTAL and the CHANGE TOTAL at the time of access. Bytes 72 through 119 contain a running count of the number of sales of each of 48 items. Bytes 120 through 167 contain the item sales count for each of the 48 items in bytes 72 through 119 at the last access to the DAU. Bytes 168 through 261 are reserved for the expanded DAU format.

When the DAU is used in a bank of vending machines, the DAU is resident in one of the vending machines and monitors within that vending machine 13 columns of items, cash in, cash out, cash box and door states. In each of two other machines is located an expander board as shown in FIG. 4. In each of these machines, eight columns of items are monitored along with cash in, cash out, cash box and door open. The expanded version software and record differ slightly from the nonexpanded version and will not be covered here.

In step 98, shown in FIG. 15, when the DTU has completed interrogation of the DAU, the microprocessor 35 in the DAU updates the histories that it maintains, i.e., the change tube histories—bytes 53 through 67; the sales histories—bytes 68 through 71; and the sales by item histories—bytes 120 through 167, with current data.

Electronic Totalizer (ETOT)

Figures 10, 10A:
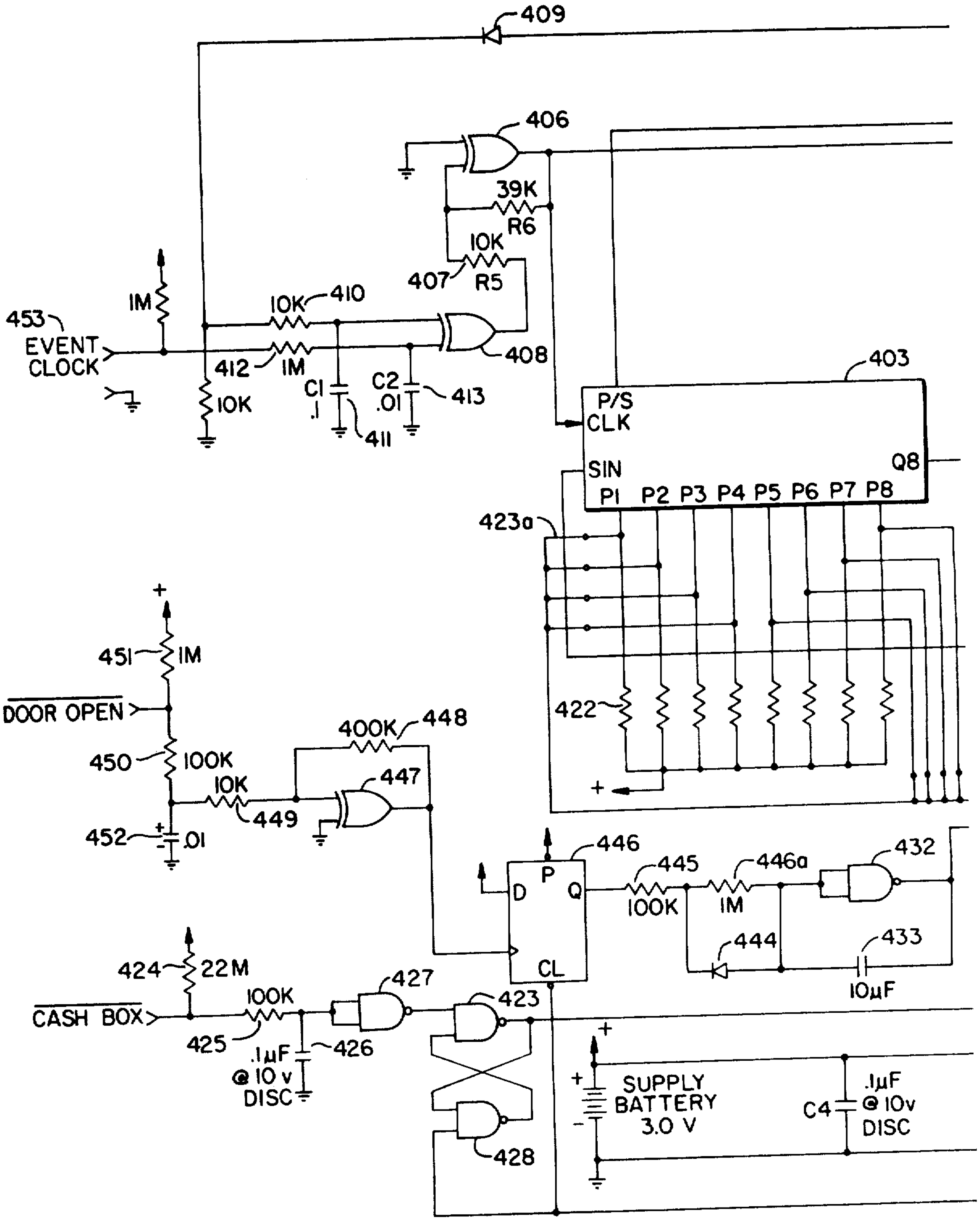
FIG. 10 is a schematic diagram of the ETOT portion of the system according to the invention.
Figure 10B:
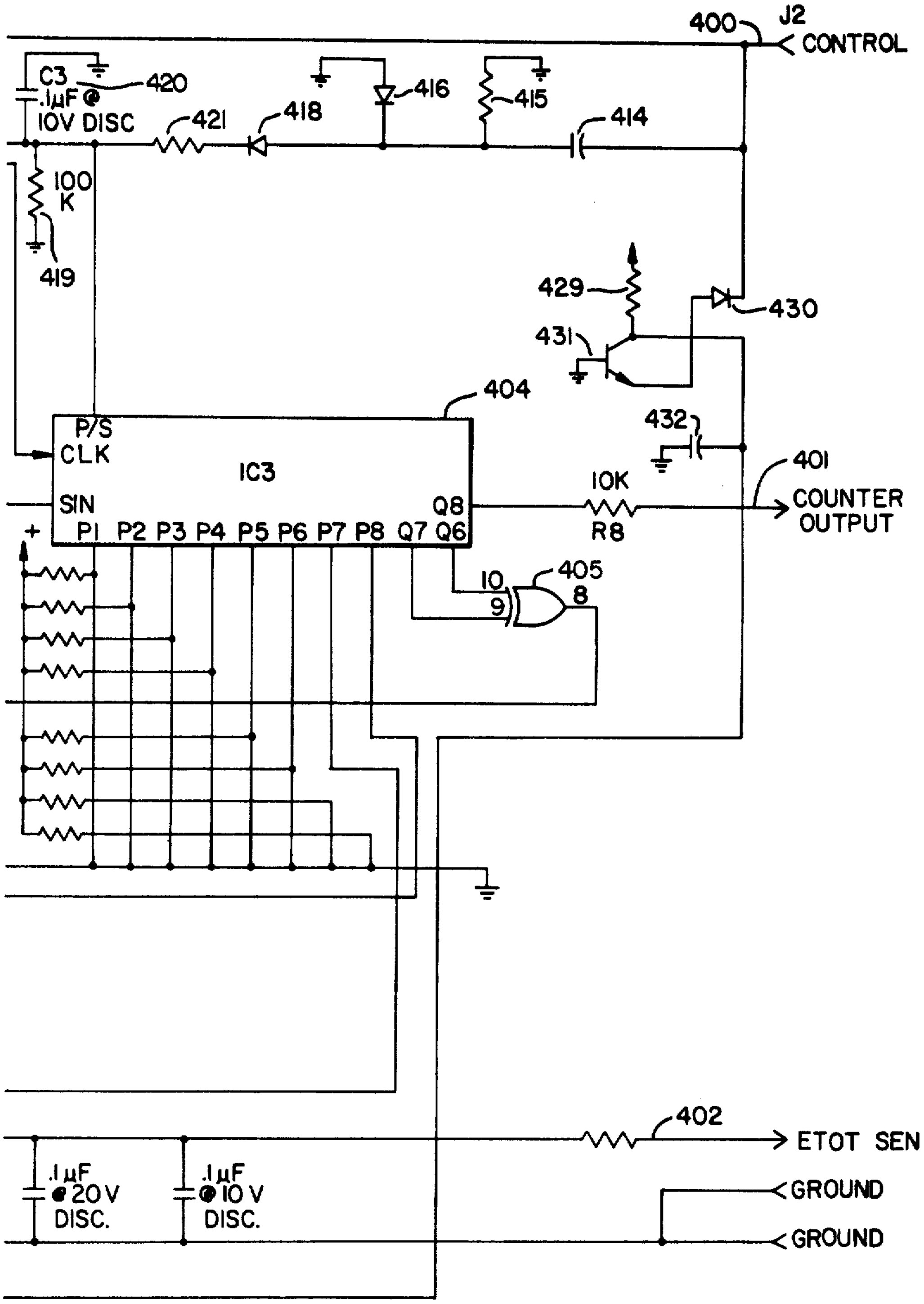

Referring now more particularly to FIGS. 1 and 10, the Electronic Totalizer (ETOT) 1B performs functions similar to the DAU, but is a potted, self-contained, single event-monitoring module used in vending machines of the type where all items vended have a single price. ETOT 1B counts the number of items sold, contains a 14 bit machine type and identification code, indicates whether the door has been opened since the last interrogation, and indicates whether the cash box has been touched since the last interrogation. ETOT 1B requires three lines to communicate with a DTU 2. These lines are the control line 400, the data line 401, and a ground line 402. ETOT 1B is powered from a 3 volt lithium battery. The event counter consists of two 8 bit parallel/serial shift registers 403 and 404. Pin Q8 of shift register 403 is connected to the serial input line of shift register 404. Pin Q8 of shift register 404 is the data output line 401 through a resistor. Pins Q7 and Q6 of shift register 404, corresponding to the 15th and 14th bits of the 16 bit shift register formed by joining shift registers 403 to shift register 404, are input into exclusive OR (XOR) gate 405. The output of XOR gate 405 is then connected to the serial input line of shift register 403.

The combination of bits shifted from shift register 403 into shift register 404, the exclusive ORing of the 15th and 14th bits of the count, and the inserting of the result into the input of the counter forms a pseudo-random counter which will assume 32,767 distinct states before repeating a state. The count bits are shifted through the counter in response to pulses applied to the clock inputs of shift registers 403 and 404 from the output of XOR gate 406. XOR gate 406 is used essentially as an amplifier and receives, through resistor 407, the output of XOR gate 408. The inputs to XOR gate 408 are the control line 400, through diode 409 and low pass filter (formed by resistor 410 and capacitor 411), and signals from the event being counted 453, through a low pass filter formed by resistor 412 and capacitor 413. Diode 409 in the control line acts to prevent any negative going signals from reaching the input of XOR gate 408. The event being counted originates from a sensor, which may be a switch which presents a connection to ground whenever an item is dispensed. The sensor may be attached to the item delivery chute, or to the dispensing arms, or to the coin input slot. (See switches 29B and 29F in FIG. 2A, for example.)

In addition to supplying the interrogating clock to the ETOT, control line 400 also provides a control signal which determines whether parallel to serial shift registers 403 and 404 are to operate in the parallel or the serial mode. The parallel/serial (P/S) control signal takes the form of a high frequency burst. This burst is applied to capacitor 414 which forms a high pass filter with resistor 415. This high pass filter is necessary to block out the lower frequency clock control signal which is also present on the control line. Diode 416 provides a discharge path for capacitor 414, as well as clamps the negative going portion of the high frequency signal to ground.

The high frequency signal is then rectified by diode 418 and then filtered by a low pass filter formed by resistor 421, resistor 419 and capacitor 420. This causes a positive DC level to be developed across capacitor 420. This DC level applied to the P/S inputs of shift registers 403 and 404 causes the data present at the parallel inputs to shift registers 403 and 404 to be loaded into the shift registers. Resistor 419 allows the voltage across capacitor 420 to discharge after the high frequency burst has ended. Therefore, when no high frequency burst is present, the voltage applied to the P/S inputs of shift registers 403 and 404 is zero volts. When zero volts is applied to ports P/S, the shift registers are set to their serial mode.

Referring now to the parallel inputs to shift registers 403 and 404, it can be seen that each input is conneced to ground as well as to a resistor which in turn is connected to the positive terminal of the battery. For example, referring to P1 of shift register 403, P1 is connected to resistor 422, and line 423*a* ties P1 to ground. Note also that line 423*a* can be severed such that pin P1 is then only connected to resistor 422. By selectively severing these ground connections for the parallel input pins, one is able to program the logic level that will be present at parallel inputs to the shift registers. (Four bits of the ID code represent a price code.) For example, with line 423*a* which connects pin P1 of shift register 403 to ground, severed, a high level in the form of +3 volts through resistor 422 is present at pin P1.

Pin 7 of shift register 404, the input to the 15th bit of the 16 bit parallel/serial shift register, formed by connecting shift register 403 to shift register 404, is connected to the output of NAND gate 423. This is the output of the cash box latch. The cash box latch receives an input from the cash box sensor (not shown) at the junction of resistors 424 (similar to that from switch 29B in FIG. 2A) and 425. The other end of resistor 424 is connected to the ETOT supply voltage, while the other end of resistor 425 is connected to one end of capacitor 426 and to the inputs, which are tied together, of NAND gate 427. The output of NAND gate 427 is connected to one of the inputs of NAND gate 423. The other input of NAND gate 423 is connected to the output of NAND gate 428. One of the inputs to NAND gate 428 is connected to the output of NAND gate 423 and finally the other end of NAND gate 428 is connected to the reset latch signal, which will be described in detail later.

The purpose of tying resistor 424 to the supply voltage is to present a high level to the input of NAND gate 427 through resistor 425 when the signal from the cash box sensor is high. The cash box sensor signal takes the form of a switch closure to ground when the cash box is present and an open circuit when the cash box has been removed. Therefore, when the cash box is present the junction of resistors 424 and 425 is tied to ground. This presents a low level to NAND gate 427. The purpose of capacitor 426 is to filter high-frequency spiking out of the signal presented to NAND gate 427. When no reset signal is being sent, the reset line is tied to the supply voltage through resistor 429. With the reset input to NAND gate 428 sitting at a "one" state when no reset signal is present, an output level from NAND gate 427 affects the cash box latch in the following manner. When the output of NAND gate 427 is low the output of NAND gate 423 is high. Since this output is connected to the input of NAND gate 428, the output of NAND gate 428 is low. This is so because the reset line is high.

With the output of NAND gate 428 coupled into the input of NAND gate 423, a low level at the output of NAND gate 428 causes the output of NAND gate 423 to remain low even when the output of 427 changes from a low to a high level. In this state a high level at NAND gate 427 will not change the output of NAND gate 423. If the reset line signal is present, i.e., presence of ground, the output of NAND gate 428 will go high. This high level coupled into NAND gate 423, the output of NAND gate 427 already being high, will cause the output of NAND gate 423 to go low. This low level, coupled into NAND gate 428 causes NAND gate 428 to remain with an output "ones" state regardless of whether the reset line changes back to a "one" state.

When in this state, if the cash box is removed, i.e., an open circuit is presented to the junction of resistors 424 and 425, the output of NAND gate 427 will go low. This would then cause the output of NAND gate 423 to go high, thereby indicating that the cash box was removed. When the cash box is replaced, i.e., a ground signal is present at the junction of resistors 424 and 425, the output of NAND gate 427 goes high. Since the other input to NAND gate 423 is low, the replacement of the cash box does not affect the output of the cash box latch. Not until a signal is sent on the reset line will the output of NAND gate 423 return to a "zero" level.

The reset signal, which is zero volts, is generated when a negative going signal is present on the control line 400. This negative going signal, i.e., zero volts to some negative voltage, causes diode 430 to conduct when the signal goes below zero volts. The cathode of diode 430 is tied directly to control line 400 while the anode of diode 430 is tied to the emitter of transistor 431. The base of transistor 431 is tied to ground and the collector is tied to one end of resistor 429 and to the reset line which goes to one input of NAND gate 428. Capacitor 432, in conjunction with resistor 429 causes the return of the reset line level from zero to a "one's" state to be delayed somewhat. The amount of delay is determined by the charging time constant determined by the value of resistor 429 and capacitor 432. When a negative going signal is present at control line 400, diode 430 conducts causing current to flow out of the emitter of transistor 431. This in turn causes current to flow into the collector of transistor 431 through resistor 429. The voltage drop across resistor 429 causes the reset line to look effectively like a ground voltage. When the signal on control line 400 returns to a zero volt level, diode 430 ceases to conduct, thus turning off transistor 431. As such, no collector current flows into transistor 431. The voltage at the reset line is effectively the power supply voltage. A "one's" state is therefore presented to the input of NAND gate 428.

Pin 8 of shift register 404 accepts the door open latch output. The door open latch signal originates from the output of NAND gate 432. Capacitor 433 connects the input of NAND gate 432 to its input. The two input lines of NAND gate 432 are tied together, and connected to one end of resistor 446*a* and the anode of diode 444. The other end of resistor 446*a* is connected to cathode of diode 444. This junction in turn is connected to resistor 445, the other end of which is connected to pin Q of D flip-flop 446. The preset pin and the input pin D are both tied to the power supply voltage. The clear pin of D flip-flop 446 is connected to the same reset signal line that is input into NAND gate 428. The clock input to flip-flop 446 clock is connected to the output of exclusive OR gate 447. Exclusive OR gate 447 is used in an amplifier mode with a feed-back resistor 448 connecting one of its inputs to its output.

A resistor 449 brings the signal into the input of exclusive OR gate 447. The door open sensor signal, similar to that from switch 63A in FIG. 2, is connected to the junction of resistors 451 and 452. The other end of resistor 451 is tied to the power supply voltage while the other end of resistor 450 is tied to the junction of resistor 449 and capacitor 452.

When the door is closed, an open circuit is presented to the junction of resistor 451 and resistor 450. This causes a high level signal to be presented through resistors 451, 450 and 449 to the input of exclusive OR gate 447. A high level voltage is therefore output from exclusive OR gate 447. On the other hand, when the door is open, a ground voltage is applied to the junction of resistors 451 and 450. This presents a low voltage to the input of exclusive OR gate 447 causing the output of exclusive OR gate 447 to be zero.

Returning now to D flip-flop 446, since the D input is tied to the supply voltage, as is the present line, a positive going signal into the clock input from the output of exclusive OR gate 447 causes the one level present at the D input to be output at pin Q of flip-flop 446. For purposes of illustration, assume that the output of NAND gate 432 is high and that the voltage across capacitor 433, measured from its junction with the input of NAND gate 432 to the output of NAND gate 432, is negative. When the output of flip-flop 446 goes high, this high level is applied to the end of capacitor 433 (having the negative voltage potential) through resistors 445 and 446*a*. Diode 444 is reverse biased and therefore does not conduct. Because capacitor 433 is at a negative potential with respect to the high level at output Q of flip-flop 446, capacitor 433 will discharge, the voltae level at the input to NAND gate 432 becoming more and more positive with the lapse of time. The voltage at this point will eventually reach a level that causes NAND gate 432 to switch states. In other words, a "one" is applied to the input of NAND gate 432, thus causing its output to go to a "zero" state.

When this occurs, the discharge of capacitor 433 is hastened, with the end tied to the input of NAND gate 432 now at the power supply voltage level with respect to the end tied to the output of NAND gate 432. Conversely, when the output of the D flip-flop 446 goes to a "zero" state, capacitor 433 discharges through diode 444 and resistor 445 to ground. The input to NAND gate 432, being tied to one end of capacitor 433, starts to fall as capacitor 433 discharges. When the level at the input drops below the threshold level of NAND gate 432, the output of NAND gate 432 goes high.

Typically, the ETOT operates in the following manner. As items are sold, a transition from a ground level to an open circuit level is presented at the event clock input 453. This is transmitted, through XOR gates 408 and 406, to the CLK pins of shift registers 403 and 404. When a clock pulse is thereby applied, the psuedo-random counter (formed by shift registers 403 and 404, and XOR gate 405) is advanced to its next state. In this way, the number of states through which the psuedo-random counter has been advanced (from its initial state) represents the number of items sold.

Figure 9:
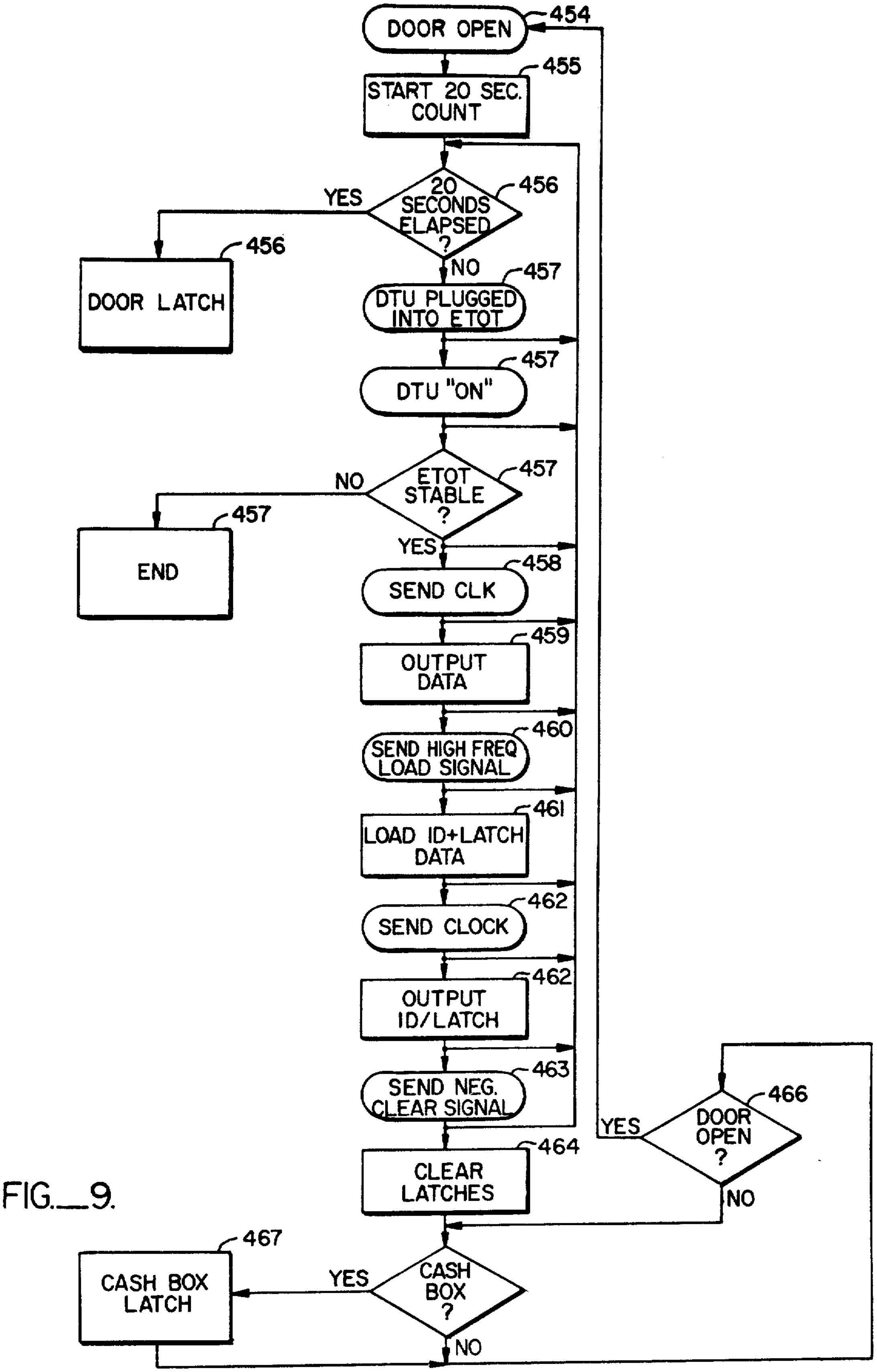
FIG. 9 is a flow chart illustrating the operation of the ETOT portion of the system according to the invention.

Referring now to FIG. 9, when the route person opens the vending machine door 454 to service the machine, capacitor 433 starts charging through resistors 445 and 446*a* (step 455). It takes approximately 20 seconds for the level at the input to NAND gate 432 to reach the necessary threshold voltage that will cause the gate to change states (step 456).

The interconnection between the DTU 2 and ETOT 1B is illustrated in FIG. 5. ETOT 1B is located inside a vending machine. In order to access an ETOT, the route person must open the vending machine door, and mechanically connect the DTU to ETOT. This is accomplished using DTU multipin connector 339 and ETOT multipin connector 1D.

After the route person plugs the DTU 2 into the ETOT 1B, and turns on the DTU 2, and after the DTU 2 verifies that the ETOT 1B is stable (step 457), a 16 pulse clock is sent on the control line 400 (step 458). In response to these clock pulses, the psuedo-random counter state is serially outputted on counter output line 401 in step 459.

The DTU then sends a high frequency load signal on the control line 400 (step 406). In response to this, the shift registers 403 and 404 load in the ETOT identification number (ID) and latch states (step 461). In step 462 the DTU clocks out the ID and latch data on line 401.

The DTU 2 then sends a negative-going clear signal (step 468) which clears the DOOR OPEN and COIN BOX latches (step 464). If before reaching step 464, 20 seconds elapse, the door open latch will indicate a "door open." The presence of a "door open" state indicates that an unauthorized entry has occurred, based upon the assumption that 20 seconds is ample time to interrogate the ETOT.

If the cash box is removed after the latches have been cleared (normally the case, since the ETOT is interrogated before the vending machine is serviced), the cash box latch will be actived to indicate that the cash box was touched on this particular access (step 467). After the route person has completed the access, the door open and cash box latches will be armed and ready to detect a new access to the machine (steps 465 and 466).

Because of judicious selection of low-power components and efficient circuit design, the typical operational life of ETOT is 7 years, and the resulting unit cost is kept low. The number of items sold by the machine since the last access is determined in the DCU by counting the number of iterations it takes, starting from a state determined by the ID of the particular ETOT, to reach the recorded item count. The item price is contained within the ETOT ID code. Together the count and the price are multiplied to yield the total sales.

Data Transfer Unit (DTU)

Figures 6, 6F:
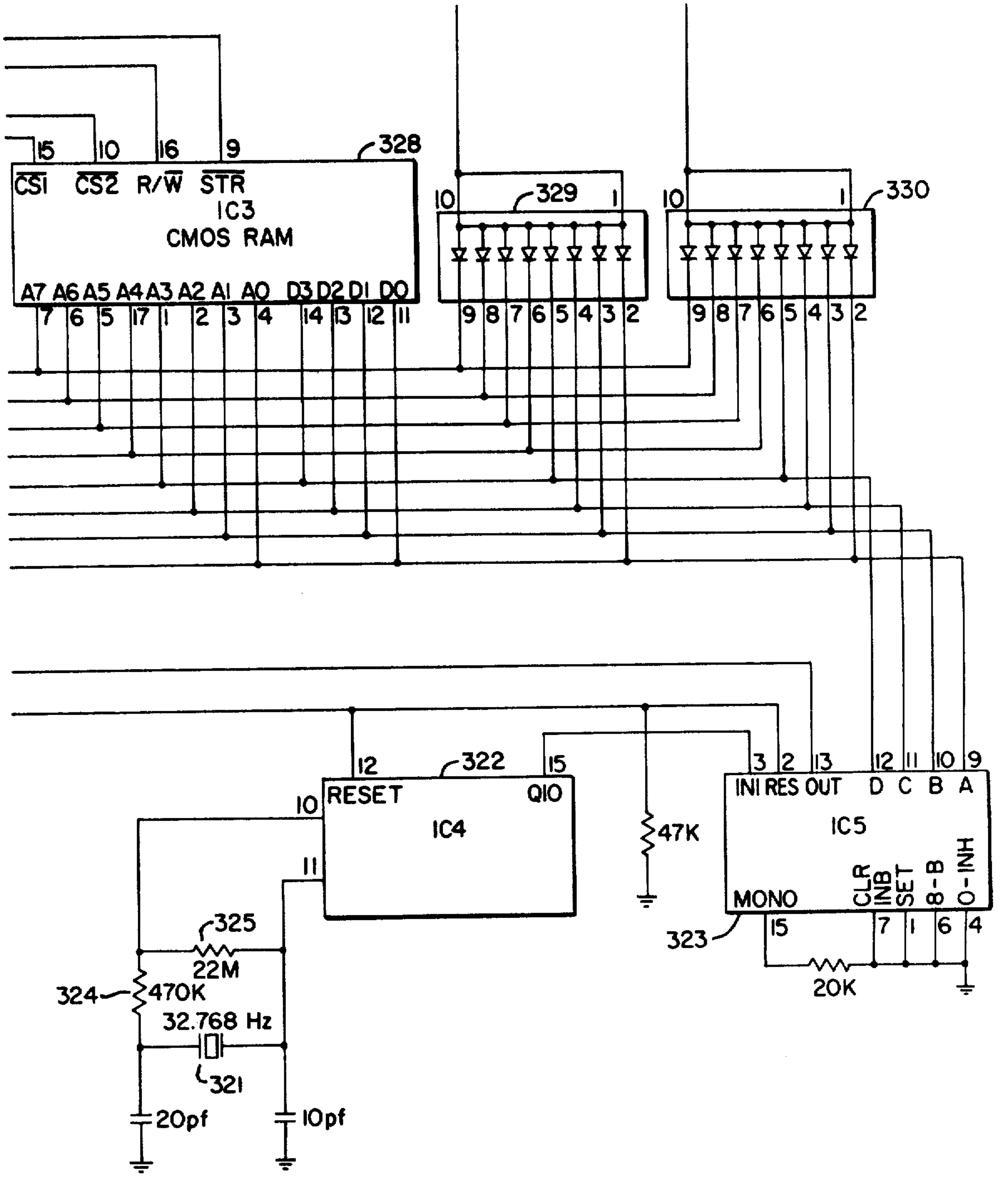
FIG. 6 is a schematic diagram of the data transfer unit portion of the system.
Figure 6A:
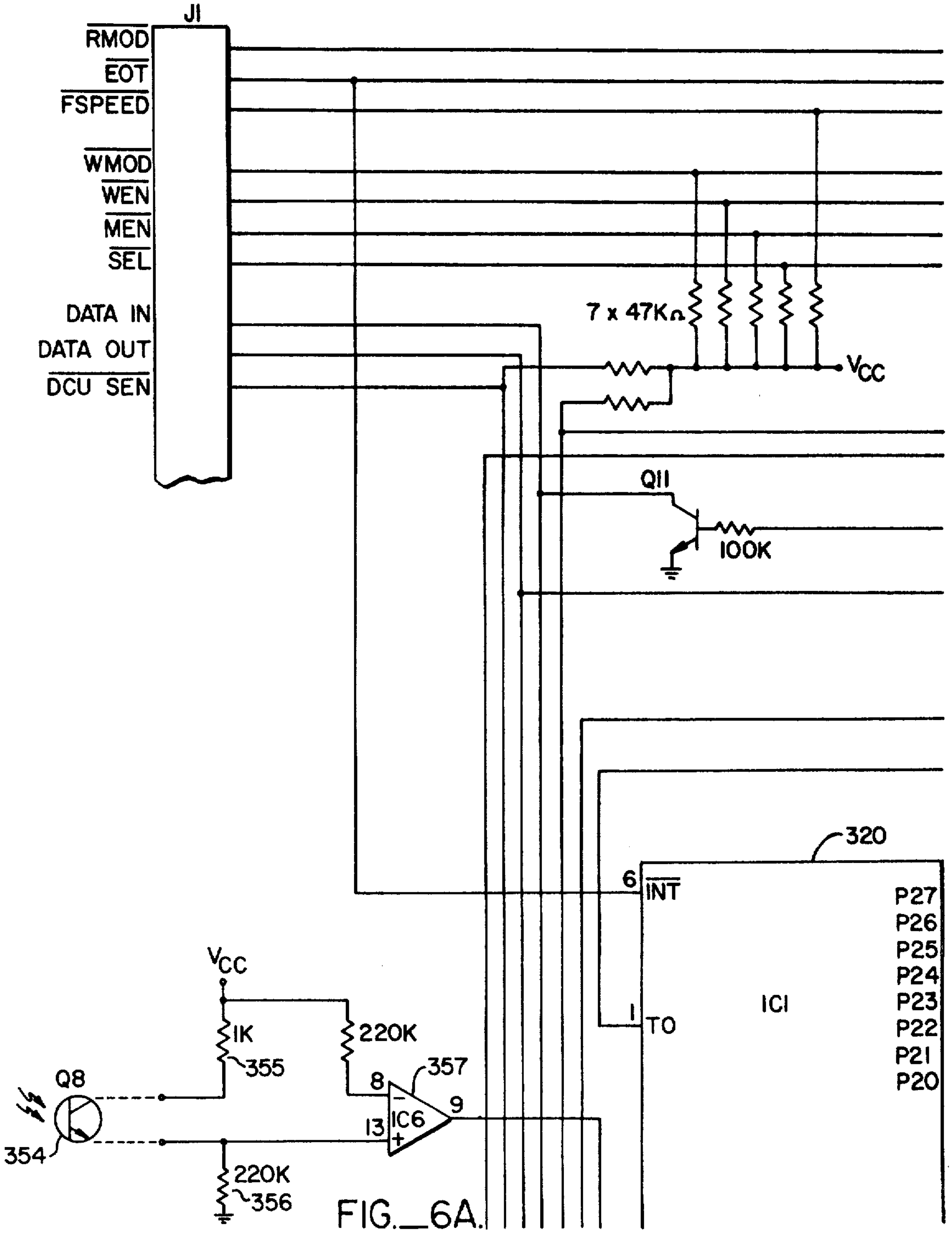
Figure 6B:
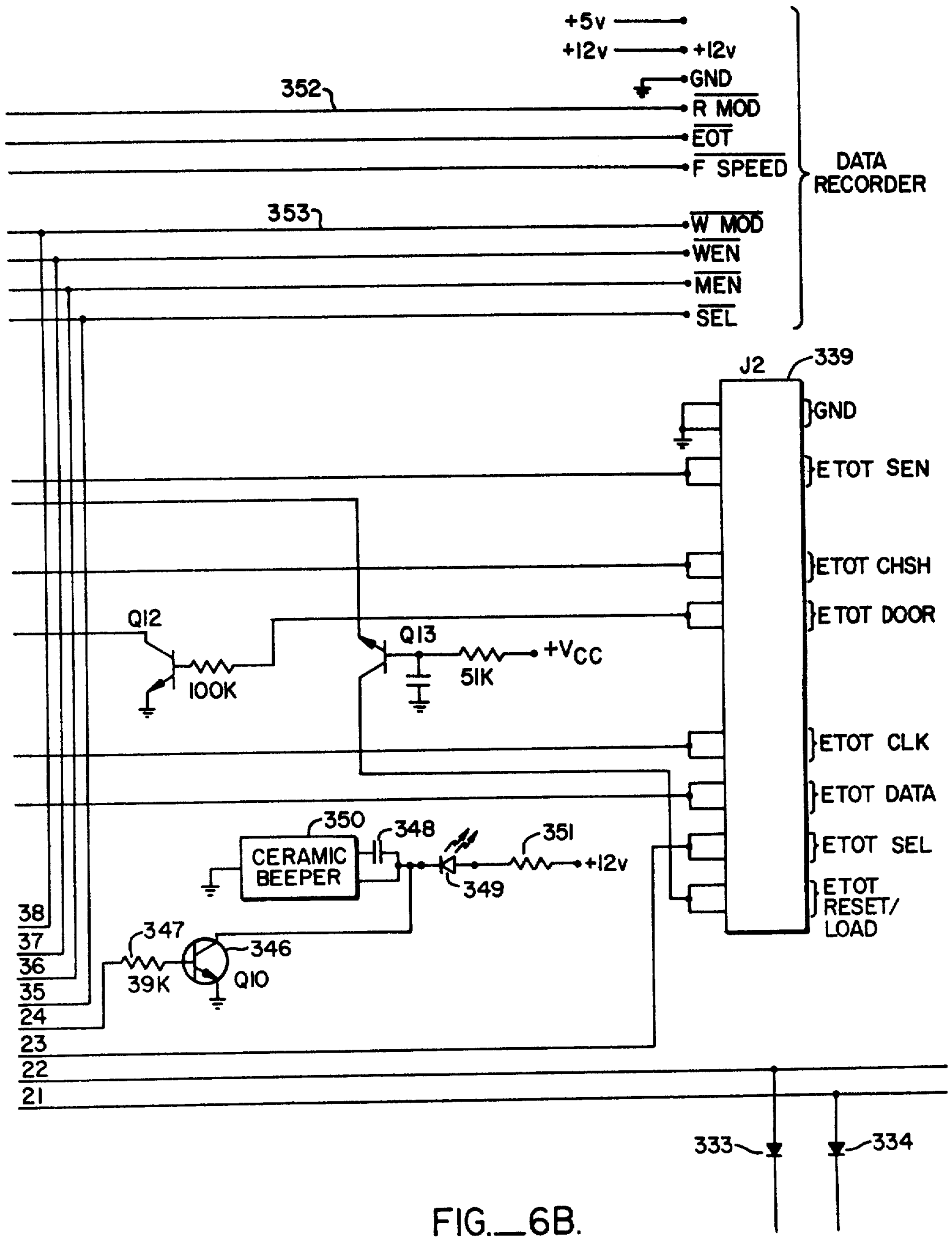
Figure 6C:
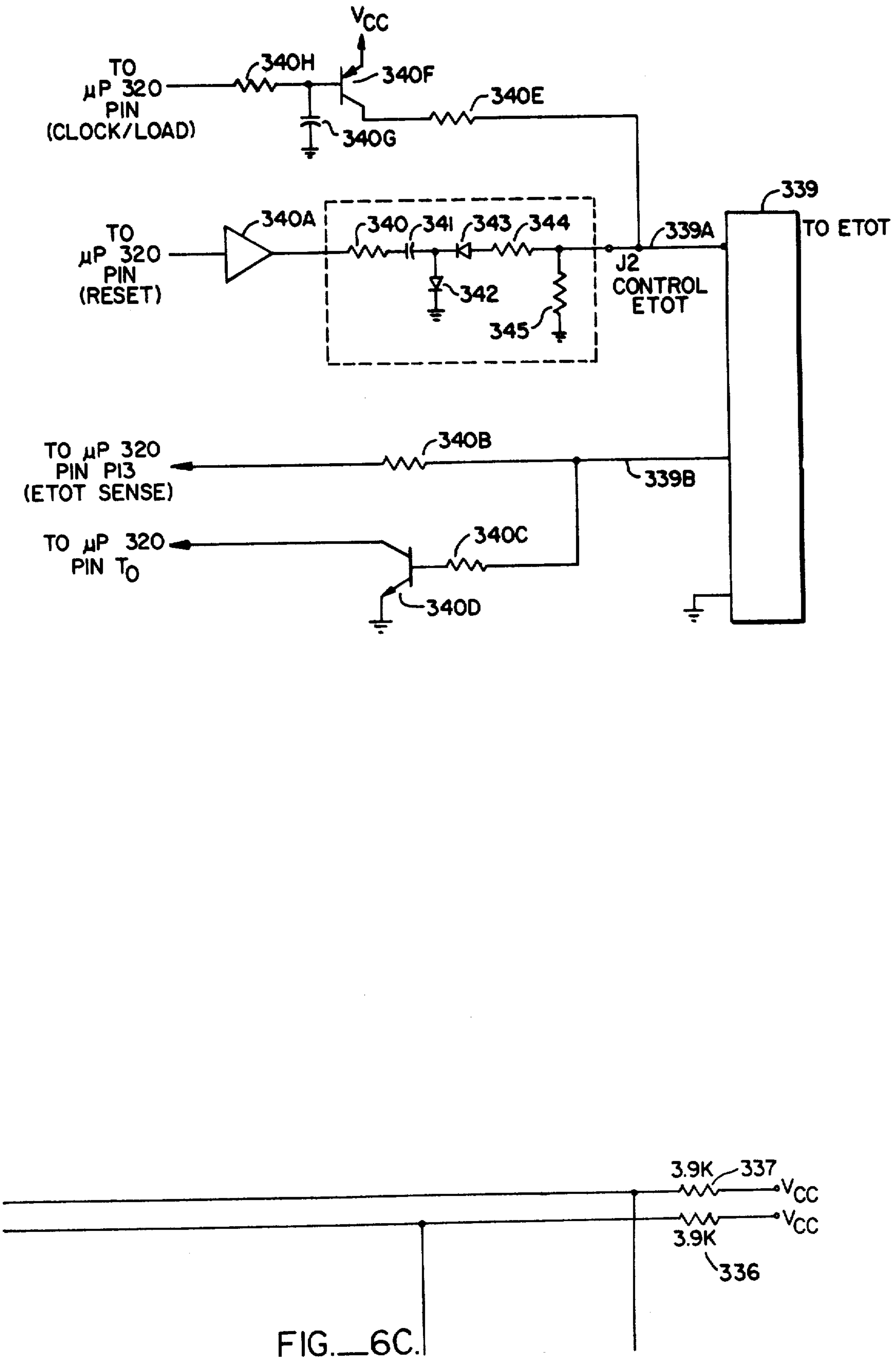
Figure 6D:
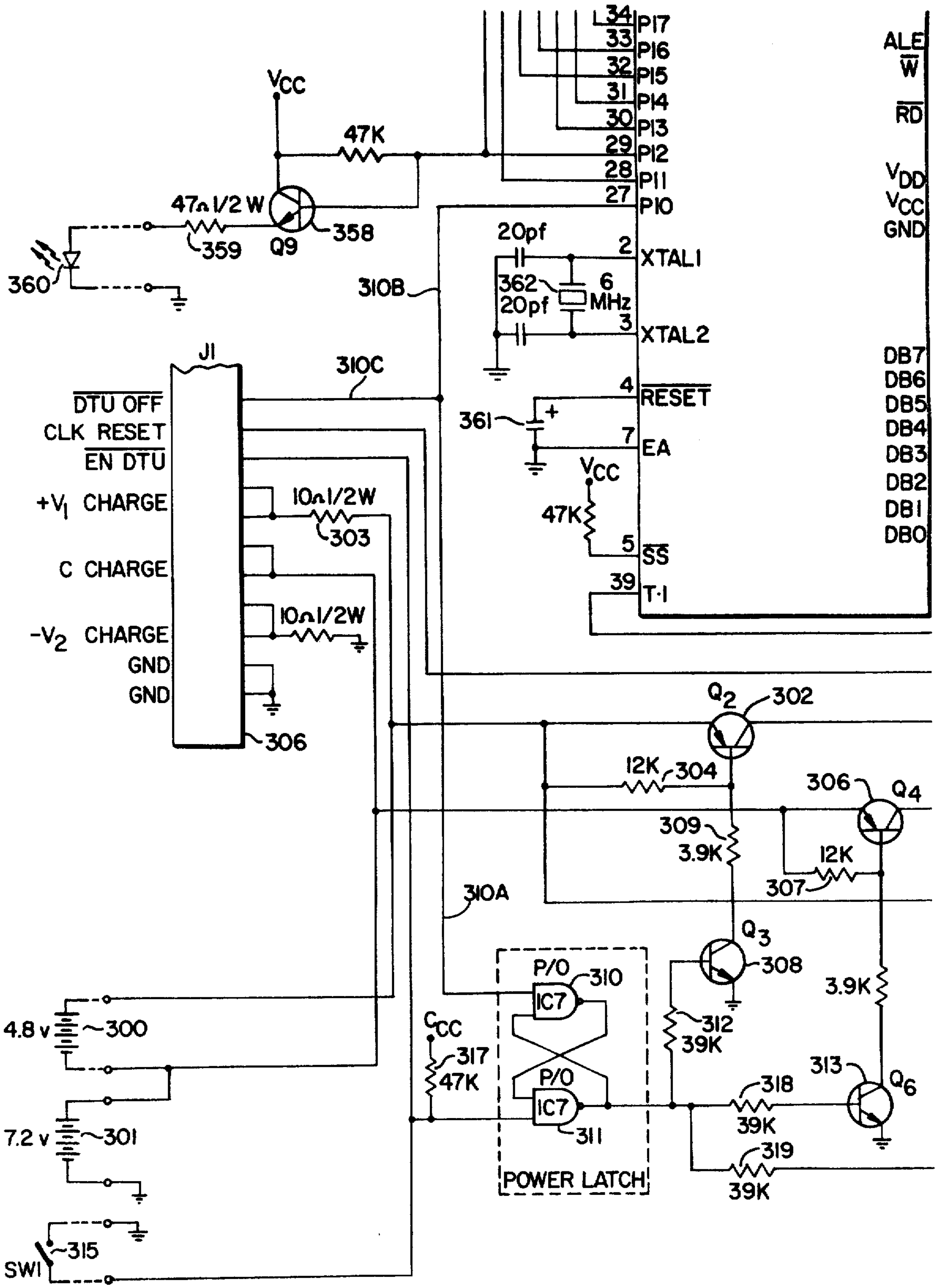
Figure 6E:
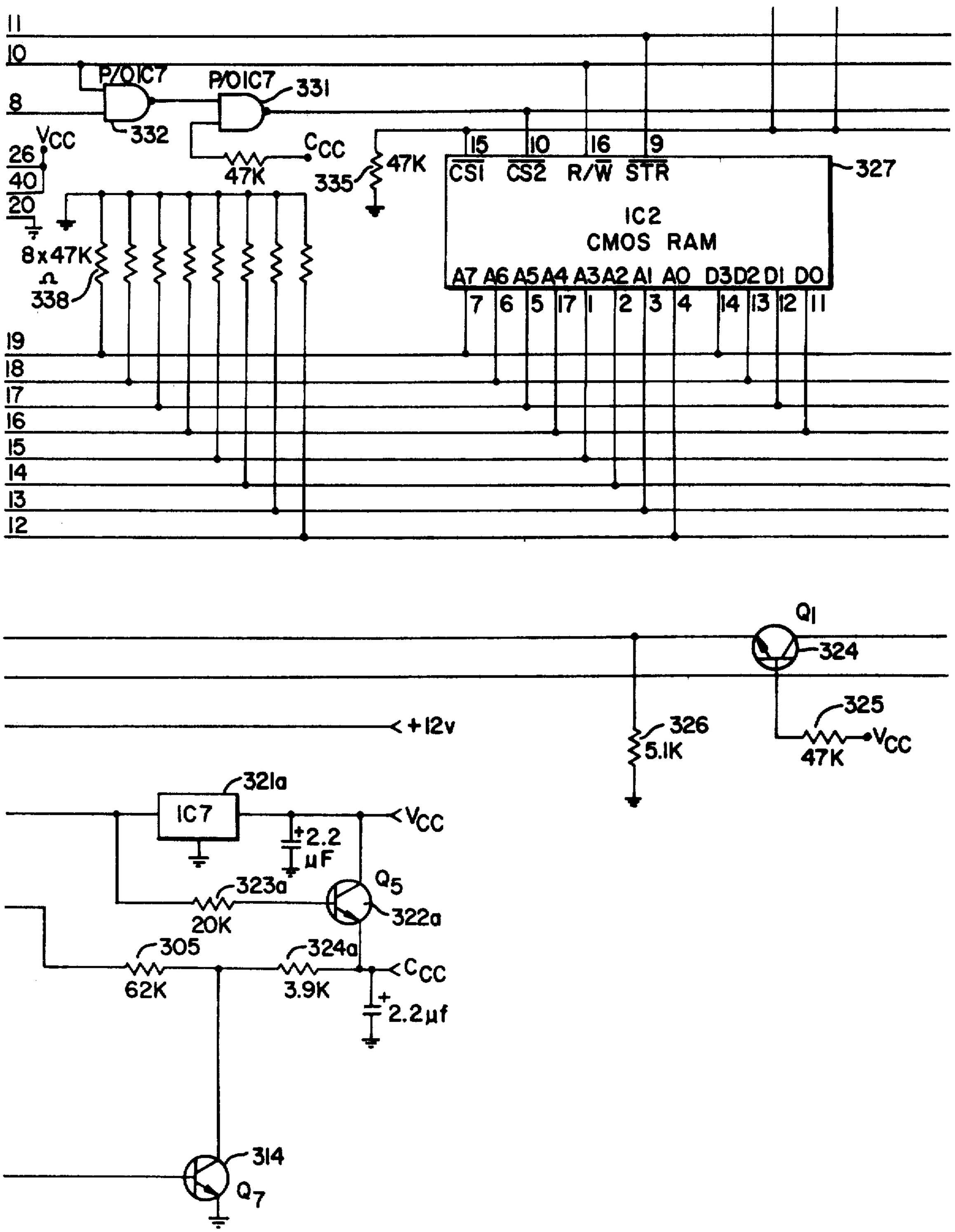

Referring to FIGS. 5, 6 information is retrieved from the DAU 1A or ETOT 1B by the Data Transfer Unit (DTU 2). The DTU 2 is a portable, hand-held unit which is carried by the route person on rounds. It contains a microprocessor 320 which controls the retrieval of the data record from the DAU 1A or the ETOT 1B, writes the record into the DTU magnetic tape mass storage 2E, and sets up the transfer of the contents of the DTU magnetic tape mass storage 2E to the Data Converting Unit (DCU 3, FIG. 1). DTUs from one office will not work in another installation although they will leave the trail and identification of their attempted use. Loss of a DTU through malfeasance or defection does not expose the company's code or data, and subsequent readiings with prior totals will enable computer regeneraton of detail lost with the DTU. A recoding of the entire system or route is accomplished on-site with a master DTU more easily than the quick change key locks now popularly used.

The DTU is battery powered (300 and 301) and can service up to 75 DAUs or ETOTs.

Information is retrieved when the route person, after making optical connection (DAU) or mechanical connection (ETOT) with the unit to be interrogated, presses the DTU-on switch 315. The DTU microprocessor 320 then scans the ETOT 1D, the DAU 1C, and the DCU 400B interface lines to determine which of the three is present. When the type of unit present is determined, the microprocessor 320 executes a "shake hands" routine with the unit to verify communication link soundness. If a DAU 1A is present, the DTU 2 then transfers its internal clock reading and DTU identification number to the DAU. The updated DAU record is then transmitted to the DTU. Initially the record is stored in two 4×256 RAMs 327 and 328. When this transfer is complete (3 seconds) the DTU signals the route person that interrogation is complete and that connection to the DAU 1A or ETOT 1B may be severed. During this time the microprocessor is transferring the record from the 4×256 RAMs 327 and 328 to the magnetic tape mass storage 2E (5 seconds).

When connection to an ETOT 1B is made, the DTU 2 verifies the soundness of the communications link, clocks out the item sales count, loads and clocks out the ETOT identification number, and "alarmed" opening latch and cash box latch states, and temporarily stores the information in the 4×256 RAMs 327 and 328. The "alarmed" opening and the cash box latches are then cleared and the ETOT identification number is reloaded. As with the DAU interrogation, the DTU transfers the information from its temporary 4×256 RAMs 327 and 328 to its magnetic tape mass storage 2E.

When connection to a DCU 3 is made, the microprocessor 320 merely powers-up the DTU 2, verifies that the communication link is sound, and then hands control of the magnetic tape mass storage 2E over to the DCU. Connection to the DCU 3 is accomplished by mechanical connectors 306 on the DTU, and 400B (one of 16 similar connectors) on the DCU rack 400A.

Referring to the bottom left corner of FIG. 6, the DTU power is supplied solely by battery 300 and battery 301. Batteries 300 and 301 are connected in series, with the negative terminal of battery 301 connected to chassis ground, and the positive terminal of battery 301 connected to the negative terminal of battery 300. The positive terminal of battery 300 is connected to the emitter of transistor 302, one end of resistor 304, one end of resistor 305, and one end of resistor 303. Resistor 303 connects the positive terminal of battery 300 to the $+V_1$ charge terminal on connector 306. When the DTU is plugged in to the DCU (at connector 400B, for example), this point on connector 306 is supplied with power to trickle-charge the batteries 300 and 301.

Returning now to transistor 302, the base of transistor 302 is connected to the other end of resistor 304 and one end of resistor 309. The other end of resistor 309 is tied to the collector of transistor 308. The combination of transistor 302 and transistor 308 functions as a switch. When the switch is on, 12 volt power is produced at the collector of transistor 302. When the switch is off, no current is allowed to flow out of the collector of transistor 302.

The switch functions in the following manner. In response to current flowing into the base of transistor 308, the emitter of which is tied to ground, current is allowed to flow into the collector of transistor 308. This current, which flows through resistor 309, is essentially the base drive to transistor 302. This current level is sufficiently high to cause transistor 302 to saturate. This effectively causes the voltage drop across the emitter and collector of transistor 302 to be about zero volts. As a result, the battery power is essentially applied to all circuitry connected to the collector of transistor 302.

On the other hand, when base current is removed from transistor 308, current is prevented from flowing into the collector of transistor 308. This essentially removes base drive from transistor 302 and prevents current from flowing out of the collector of transistor 302. This, then, essentially removes battery power from all circuitry connected to the collector of transistor 302.

The circuitry which injects or prevents current from flowing into the base of transistor 308 is the power latch formed by NAND gates 310 and 311. One input of NAND gate 311 is tied to one end of resistor 317 and to one pole of switch 315. The other pole of switch 315 is tied to ground, while the other end of resistor 317 is tied to $C_{cc}$ (the CMOS supply voltage). The other input of NAND gate 311 is tied to the output of NAND gate 310. Conversely, one input of NAND gate 310 is tied to the output of NAND gate 311. The other input of NAND gate 310 is tied to a terminal on connector 306 and to pin $P_{10}$ of microprocessor 320. The output of NAND gate 311 is tied to the base of transistor 308 through resistor 312. Switch 315 is normally opened, therefore $C_{cc}$, connected to the input of NAND gate 311 through resistor 317, holds the input high. In this state when a low level is applied to the input to NAND gate 310, its output goes to a high state, which causes both inputs to NAND gate 311 to be in a high state. This causes the output of NAND gate 311 to assume a low state. This, in turn, causes a low state to be applied to the other input to NAND gate 310 which acts to keep the output of NAND gate 310 in a high state, even though the input to NAND gate 310 from microprocessor 320 subsequently changes to a high state.

Similarly, when switch 315 is closed, the input to NAND gate 311 is temporarily set to a low level. This causes the output of NAND gate 311 to assume a high state. This high level is applied to one of the inputs of NAND gate 310. With the other input to NAND gate 310 being normally high, the output of gate 310 is low. Since the output of NAND gate 310 is connected to the input of NAND gate 311, this low state at the output of NAND gate 311 effectively maintains the output of NAND gate 310 at a "one" level. As a result, even when switch 315 is reopened, such that resistor 317 applies a high level to the input of NAND gate 311, the output of gate 311 is maintained at a high state.

In a similar manner, the latch formed by NAND gates 310 and 311 controls the base drive to transistor 313. This, in turn, controls the base drive to transistor 306. Transistor 306 acts like a switch to connect the positive terminal of battery 301 to regulation circuitry $C_{cc}$ for regulating $V_{cc}$ and $C_{cc}$ power. Regulated $V_{cc}$ power is provided essentially through integrated circuit voltage regulator 321a. $C_{cc}$ power is essentially equal to regulated $V_{cc}$ when the DTU is on and 12 volts when the DTU is off. The bi-state level is implemented in the following manner. The collector of transistor 322a is tied to the output of integrated circuit voltage regulator 321a. The base of transistor 322a is tied to the input of regulator 321a through resistor 323a. The emitter of transistor 322a is tied to $C_{cc}$ and one end of resistor 324a. The other end of resistor 324a is connected to one end of resistor 305 and the collector of transistor 314. As described previously, the other end of resistor 305 is tied to the positive terminal of battery 300. Transistor 314 is controlled by the latch formed by NAND gates 310 and 311 through the application of base current through resistor 319 and into the base of transistor 314. When such base current is so applied, collector current into transistor 314 is allowed to flow, providing a path for transistor 322a emitter current. The values of resistors 323a and 324a are such that base current flowing into transistor 322a through resistor 323a causes transistor 322a to saturate. (The current through resistor 323a is determined by the voltage drop across voltage regulator 321*a*.) This causes the emitter of transistor 322*a* to be at essentially the same voltage as the collector of transistor 322*a*. This voltage is regulated $V_{cc}$. Therefore, $C_{cc}$ is equal to regulated $V_{cc}$ when the DTU is on.

When the DTU is off, the power latch causes transistors 313 and 314 to turn off, therefore no current flows into the collector of transistor 314 and no base drive is supplied to transistor 322*a*. As a result, transistor 322*a* is off and $C_{cc}$ is no longer equal to $V_{cc}$. Instead, resistor 305 provides a connection between the battery 300 and $C_{cc}$. $C_{cc}$, when the DTU is off, is then a voltage equal to the voltage of battery 300 plus the voltage of battery 301.

In summary then, the power supply section of the DTU is powered by two batteries and has output voltages of +12 volts, regulated $V_{cc}$ and $C_{cc}$. The power supply section is controlled by a chassis mounted switch 315 and by commands line 301A from the microporcessor 320 line 310B, and commands applied through connector 306 from the DCU line 310C. When the DTU is on, $C_{cc}$ is equal to $V_{cc}$. When the DTU is off, $C_{cc}$ is equal to the voltage of the battery 300 added to the voltage of battery 301.

The DTU internal clock is formed by a 32.768 K Hertz crystal 321, a 14 state binary ripple counter 322, and an extension timer 323. One end of crystal 321 is connected to pin 11 of ripple counter 322. The other end of crystal 321 is connected to pin 10 of ripple counter 322 through resistor 324*b*. Resistor 325 is connected across pin 10 and pin 11 of ripple counter 322. Pins 10 and 11 of ripple counter 322 connect to an inverter stage within ripple counter 322. This inverter stage, in combination with crystal 321, resistor 324*b* and resistor 325, forms a 32.768 kilohertz Schmidt Trigger Oscillator. Within ripple counter 322 this 32.768 kilohertz signal is fed into the 14 stage counter circuitry. For purposes of the DTU clock, the output at the 10th stage of the counter is used. This essentially divides the oscillator frequency by 1024, yielding a 32 Hertz signal. This signal is present at pin 15 of ripple counter 322 and is then fed into the input pin 3 of extension timer 323. The output of extension timer 323 appears at pin 13 and is connected to the collector of transistor 324. The base of transistor 324 is connected to regulated $V_{cc}$ through resistor 325. The emitter of transistor 324 is connected to one end of resistor 326 and to port $T_1$ of microprocessor 320. The other end of resistor 326 is attached to chassis ground. When the DTU has been activated by a closure of switch 315, or upon command of the DCU, regulated $V_{cc}$ is present at resistor 325. When the output of extension timer 323 is in its high state (equal to $C_{cc}$), the transistor 324 is essentially saturated. The emitter of transistor 324 will therefore be approximately equal to the voltage present at the collector of transistor 324. When the extension timer 323 is in its low state (equal to zero volts), transistor 324 is turned off, since its base-collector junction will be reverse biased. The base-emitter junction of transistor 324 then acts as a diode, with resistors 325 and 326 forming a voltage divider. The voltage present at the emitter of transistor 324 is then approximately zero volts. Thus, it may be seen that when the DTU power is on, i.e., regulated $V_{cc}$ power is present, the emitter of transistor 324 transmits the output of extension timer 323 to pin $P_1$ of microprocessor 320, and that the signal level is from about zero volts in its low state to regulated $V_{cc}$ voltage in its high state.

On the other hand, when the DTU is off, regulated $V_{ec}$ power is not present, and the end of resistor 325, which is connected to regulated $V_{cc}$ is essentially connected to ground. With the base of transistor 324 essentially tied to ground through resistor 325, the transistor will essentially be in its off state for any positive voltages present at the collector. This is so because no base drive current will be available through resistor 325 to the base of transistor 324. This blocking action of transistor 324 is necessary when the DTU is off because, as explained previously, when the DTU is off, voltage level $C_{cc}$ rises to about 12 volts. In turn, since extension timer 323 is powered for the $C_{cc}$ power line, the output of this timer will vary between zero and 12 volts. This voltage level would be sufficient to damage microprocessor 320. The ripple counter 322 and the extension timer 323 are reset by a signal from the DCU connected to the DTU through the CLK RESET terminal on connector 306 and applied to pin 12 of ripple counter 322, and pin 2 of extension timer 323.

Extension timer 323 maintains a count of one second increments. Microprocessor 320, when a reading of the DTU clock is desired, addresses extension timer 323 ports D, C, B and A. DTU clock data consist of a 16 bit word. As the microporcessor addresses each bit, the state of the bit is output at extension timer port OUT. This level is transmitted to microprocessor port T1 through transistor 324.

The communication and storage functions of the DTU 2 are controlled by microprocessor 320. Generally, microprocessor 320 performs the following functions.

(1) Communicates with the DAU 1A, (2) Reads and writes data out of temporary electronic memory RAM 327 and RAM 328, (3) Retrieves the DTU identification code from diode array 329 and 330, (4) Retrieves time data from extension timer 323, (5) Transfers data into and receives data out of magnetic tape mass storage, (6) Communicates with and receives data from ETOT 1B modules, (7) Provides a visual indicator 349 to the route person that the proper link has been established between the DTU 2 and the module being interrogated, as well as audio signal when data transfer is complete, and (8) Communicates with the DCU 3.

The microprocessor external memory consisting of RAMs 327 and 328 is essentially a 4×256 byte random access memory. The configuration uses an 8 bit address which is supplied from pins $DB_0$ through $DB_7$ of microprocessor 320. RAMs 327 and 328 each provides 4 bits of data which together form an 8 bit data word. Address lines from the microprocessor are connected to pins $A_0$ through $A_7$ of RAM 327 and RAM 328, and data are transmitted and received through pins $D_0$ through $D_3$ of RAM 327 and RAM 328. Microprocessor pins $DB_0$ through $DB_7$ receive and transmit data to the external memory. Thus it can be seen that data and address lines are shared. A signal from pin ALE of microprocessor 320 applied to pin STR of RAMs 327 and 328 allows the RAM to distinguish between address and data information.

Reading and writing information into RAMs 327 and 328 are controlled by microprocessor 320 through its w pin (which is connected to pin R/W of RAMs 327 and 328). When a high level is present at pin R/W, the RAMs are instructed to read data out of memory, and when low level is present at pin R/W, the RAMs are instructed to write data into the memory.

Pins $CS_1$ and $CS_2$ of the RAMs are control pins, with a high level at pin $CS_1$ acting to disable the RAMs and the low level at pin $CS_2$ acting to enable the RAMs. This disable/enable capability is necessary to allow input of DTU identification data, which also use the same data lines as the RAMs. The enable signal to pin $CS_2$ of the RAMs comes from the output of NAND gate 331. NAND gate 331 acts to invert the output of NAND gate 332. The inputs to NAND gate 322 are the write signal from pin W of microprocessor 320 and the read signal from pin RD of microprocessor 320. A low level at W pin corresponds to a write command while a low voltage at pin RD corresponds to a read command. Thus, it can be seen that when either a write or read command is given, the output of NAND gate 332 will be high, causing the output of NAND gate 331 to be low. When neither a read nor a write command is given, the high levels present at the W and RD pins of microprocessor 320 cause the output of NAND gate 332 to be low, thereby causing the output of NAND gate 331 to be high.

The disable signal to pin $CS_1$ of the RAMs involves interaction of signals at pins $P_{21}$ and $P_{20}$ of microprocessor 320 with diodes 333 and 334, resistors 337 and 336, as well as resistor 335. One end of resistor 336 is connected to regulated $V_{cc}$ while the other end is connected to the anode of diode 334, pin $P_{20}$ of microprocessor 320, and the anodes of the diodes within diode matrix 329. The cathode of diode 334 is connected to pin $CS_1$ of the RAMs 327 and 328, as well as to one end of resistor 335. The other end of resistor 335 is connected to chassis ground. When the disable signal is given at pin $P_{20}$ of microprocessor 320, i.e., a low level, diode 334 is nonconductive. The voltage present at pin $CS_1$ of the RAMs 327 and 328 is essentially ground, through resistor 335. An enable signal from pin $P_{20}$ of microprocessor 320 is essentially an open circuit, therefore, a voltage divider is formed between resistor 336, diode 334 and resistor 335. The voltage then presented to ports $CS_1$ of RAMs 327 and 328 is approximately 3½ volts, i.e., a high level.

The DTU ID code is provided by diode matrices 329 and 330. The ID number is selected by connecting the bit position, desired to correspond to a "one," to regulated $V_{cc}$ using a diode. When the diode matrix is enabled by the microprocessor, a voltage divider is formed by resistor 336, the diodes that are in place, and resistors in the data lines that tie the data lines to ground (for example, referring to the data line connected to pin $DB_7$ of microprocessor 320, resistor 338 ties that line to ground). Assume that a diode is inserted in the diode array 329, and that its anode is connected to one end of resistor 336, and that its cathode is connected to pin $DB_7$ of microprocessor 320, and to resistor 338. When diode array 329 is enabled, the diode inserted in array 329 is forward biased. The voltage divider that is formed between resistor 336 and resistor 338 presents voltage of about 3½ volts to pin $DB_7$ of microprocessor 320. When the diode array is disabled, the diode within diode matrix 329 is reverse biased thereby causing a low voltage, i.e., ground, to be presented to pin $DB_7$ of microprocessor 320 through resistor 338. Conversely, if no diode were inserted in the particular bit position of the diode array, when the diode array was enabled, no voltage divider would be formed and pin $DB_7$ would see essentially ground, through resistor 338.

Returning now to the address and data lines of microprocessor 320, note that each address/data line is connected to ground through a resistor, e.g., resistor 338 connects pin $DB_7$ to ground. These resistors act to pull the address/data line to ground when no voltage is applied to the lines. Note also that RAMs 327 and 328 share data and address lines with diode arrays 329 and 330, and also share address lines with the extension timer 323. When the RAMs 327 and 328 are being interrogated or addressed by the microprocessor 320, the disable signals to the ID diode arrays 329 and 330 keep the arrays from interacting with the functioning RAM. Since the extension timer 323 uses the address/data lines for address purposes only there is no interference with RAM operation by extension timer function. Likewise, when the ID diode arrays 329 and 330 are enabled, the microprocessor 320 through pin $P_{21}$ and diodes 333 and 334 disables the RAMs, and thereby prevents the RAMs from interacting with the identification data. Similarly, although the address lines to the extension timer 323 will have address data on them when the microprocessor 320 is interrogating the RAMs or the ID diode arrays, the microprocessor 320 simply ignores the signals being transmitted to pin $T_1$. Only when a DTU time reading is desired does microprocessor 320 pay any attention to the data coming in at its pin $T_1$.

The DTU communicates with ETOT through a three-line mechanical connection. These lines are brought out at connector 339 and consist of a data line, a control line, and a ground line. The data line on connector 339 is connected to microprocessor 320 at pin $T_0$. The ETOT sense line of connector 339 is connected to pin $P_{13}$ of microprocessor 320. The control line 339A of connector 339 is connected to circuitry which generates three different control signals:

(1) A normal clock frequency, (2) A high frequency burst, (3) A negative-going square wave.

The normal clock frequency and high frequency burst signals originate from microprocessor 320. This pin is tied to one end of resistor 340H. The other end of resistor 340H is tied to the base of transistor 340F and to one end of capacitor 340G. The other end of capacitor 340G is tied to ground. The purpose of capacitor 340G is to keep transistor 340F off, when the DTU power switch 315 is first activated. The reason for this is that, should the DTU 2 be plugged into an ETOT 1B at the time of power up without the capacitor 340G present, the transients, output on the clock/load pin of the microprocessor 320 due to the power-up, could modify the data stored in the ETOT 1B. The collector of transistor 340F is tied to $V_{cc}$ so that when microprocessor 320 makes a transition from high to low or vice versa, the collector of transistor 340F makes a low to high, or vice versa, transition. Resistor 340E, one end of which is connected to the collector of transistor 340F, is connected to line 339A. Resistor 340E provides current limiting for transistor 340F.

The source of the negative-going square wave is described next. A positive-going square wave from microprocessor 320 is applied through amplifier 340A to one end of resistor 340. One end of capacitor 341 is connected to the other end of resistor 340, and the other end of capacitor 341 is tied to the anode of diode 342 and the cathode of diode 343. The anode of the diode 343 is connected to a voltage divider formed by resistors 344 and 345. The output of the circuit is taken at the junction of resistors 344 and 345, and tied to line 339A.

On the positive-going transition of the input wave form, capacitor 341 charges through resistor 340 and diode 342. While capacitor 341 is charging, there is about a 7/10ths of a volt drop from the anode to the cathode of diode 342. This voltage drop causes diode 343 to be reverse biased thus preventing any current from flowing through resistors 344 and 345. The voltage at the output of the circuit is therefore zero volts.

Conversely, on the negative-going transitions of the input wave form the end of resistor 340 that is connected to the input source is essentially tied to ground. As a result, capacitor 341 attempts to discharge through resistor 340. Diode 342 is reverse biased and does not conduct while the cathode of diode 343 is at a lower voltage than its anode. Diode 343 is forward biased and current flows through resistors 344 and 345 into diode 343 and then into capacitor 341, thereby producing a negative voltage drop across resistors 344 and 345.

Line 339A is able to handle both the clock/load positive-going signals from transistor 340F and the reset negative-going signals from resistors 344 and 345 because (1) when one source is in operation, the other one is off, and (2) the load that each presents to the other does not interfere with the other's operation. (E.g., the reset circuitry presents a high impedance resistive load to transistor 340f, while the clock/load circuitry presents an open circuit load to the reset circuitry.)

Data from ETOT and ETOT sense signals are brought in on the same line 339B. One end of resistor 340C is tied to line 339B. The other end is tied to the base of transistor 340D. The purpose of transistor 340D is to present a non-zero impedance to ETOT data line when the DTU 2 is first turned on. The emitter of transistor 340D is tied to ground, while its collector is tied to pin $T_0$ of microprocessor 320. The ETOT sense input is taken from line 339B through resistor 340B and tied to microprocessor 320 pin $P_{13}$. The presence of an ETOT is determined by monitoring the change at the collector of transistor 340D (pin $T_0$ of microprocessor 320), when the ETOT sense line is varied between high and low levels. ETOT places a resistive load on line 339B, therefore if resistor 340B (on the ETOT sense line) is large enough, a high signal out of microprocessor 320 pin $P_{13}$ will not cause transistor 340D to respond. On the other hand, if ETOT is not present, the level at pin $P_{13}$ of microprocessor 320 should be enough to cause transistor 340D to respond.

The light indication and audio alarm which are activated by the microprocessor 320 (to signal that the data transfer from the unit being interrogated has been completed) are controlled by pin $P_{23}$ of microprocessor 320. The signal from pin $P_{23}$ is input into the base of transistor 346 through resistor 347. The emitter of transistor 346 is tied to ground while the collector is tied to capacitor 348 and the cathode of LED 349. The other end of capacitor 348 is tied to the positive terminal of a ceramic beeper. The other end of the ceramic beeper is tied to ground. The anode of LED 349 is tied to +12 volts through resistor 351. When no signal is applied by pin $P_{23}$ of microprocessor 320, no current flows through the collector of transistor 346, capacitor 348 is fully charged to +12 volts, and because cathode of LED 349 is at the same voltage as the anode, LED 349 does not light.

When a signal is applied by pin $P_{23}$ of microprocessor 320, base drive is applied to transistor 346, the voltage at the collector of transistor 346 moves towards ground, current flows into the collector of transistor 346, capacitor 348 starts to discharge through the ceramic beeper 350 and the collector of transistor 346; and, the cathode of LED 349 being at a more negative voltage than its anode, LED 349 conducts and emits a visible signal. When the signal applied by pin $P_{23}$ of microprocessor 320 is an AC signal, capacitor 348 essentially AC couples that signal into the ceramic beeper 350.

The microprocessor 320 controls the magnetic tape mass storage 2E through pins $P_{24}$, $P_{25}$, $P_{26}$, $P_{27}$ and INT. Pin $P_{24}$ controls input and output buffers of the data recorder. Pin $P_{25}$ of the microprocessor 320 controls the motor of the data recorder. Pin $P_{26}$ controls the read/write mode of the data recorder. Pin $P_{27}$ supplies data to the data recorder, while pin INT receives the end of tape indication from the data recorder.

Because the DCU also controls the data recorder when the DTU is plugged into the DCU, the lines which the microprocessor 320 uses to control the data recorder are also brought out to the DCU connector, part of connector 306. There are several lines which run from the DCU connector directly to the data recorder. These lines are the data output line 352 and tape control line 353. Microprocessor 320 has no control over these lines. The data-in line which runs from connector 306 to pin $P_{16}$ of microprocessor 320 is used to input the time/date record as well as to reset the DTU clock. The data-out line which runs from DTU connector 306 to pin $P_{15}$ of microprocessor 320 receives DTU ID information and DTU clock time data. Pin $P_{17}$ of the microprocessor 320 receives serial data from the DAU. Phototransistor 354 receives optical impulses from the DAU. The optical pulses, falling on the base of transistor 354, are converted into current flowing through the collector and emitter of transistor 354. The resistor 355 ties the collector of transistor 354 to regulated $V_{cc}$. Resistor 356 ties the emitter of transistor 354 to ground. Emitter of transistor 354 is also tied directly to the positive input of integrated circuit current amplifier 357. The variation of optical pulses impinging on the base of transistor 354 causes a variation in emitter current of transistor 354. This, in turn, causes a variation in current into current amplifier 357. Current amplifier 357 converts these differences in current into voltage excursions at its output. These voltage excursions are then input into pin $P_{17}$ of microprocessor 320 and represent the serial data retrieved from the DAU.

Pin $P_{12}$ (the data and communication output pin) of microprocessor 320 drives transistor 358 which is in an emitter-follower configuration. The emitter of transistor 358 drives an infrared light emitting diode 360 through resistor 359. Communication is thus conducted with the DAU in optical form.

One end of capacitor 361 is connected to pin RESET of microprocessor 320 and its other end is connected to ground. When the DTU is turned on, power is then applied to microprocessor 320, but the voltage across capacitor 361 will essentially be zero volts. Thus, zero volts will be applied to the RESET pin of microprocessor 320 causing it to reset its internal circuitry. Internal connections from the power supply voltage to the RESET pin of microprocessor 320 will eventually charge capacitor 361 such that a low level will no longer be present at the RESET pin. Microprocessor 320 may then proceed with the execution of its program. Crystal 362 provides the 6 megahertz clock for microprocessor 320.

Figure 7:
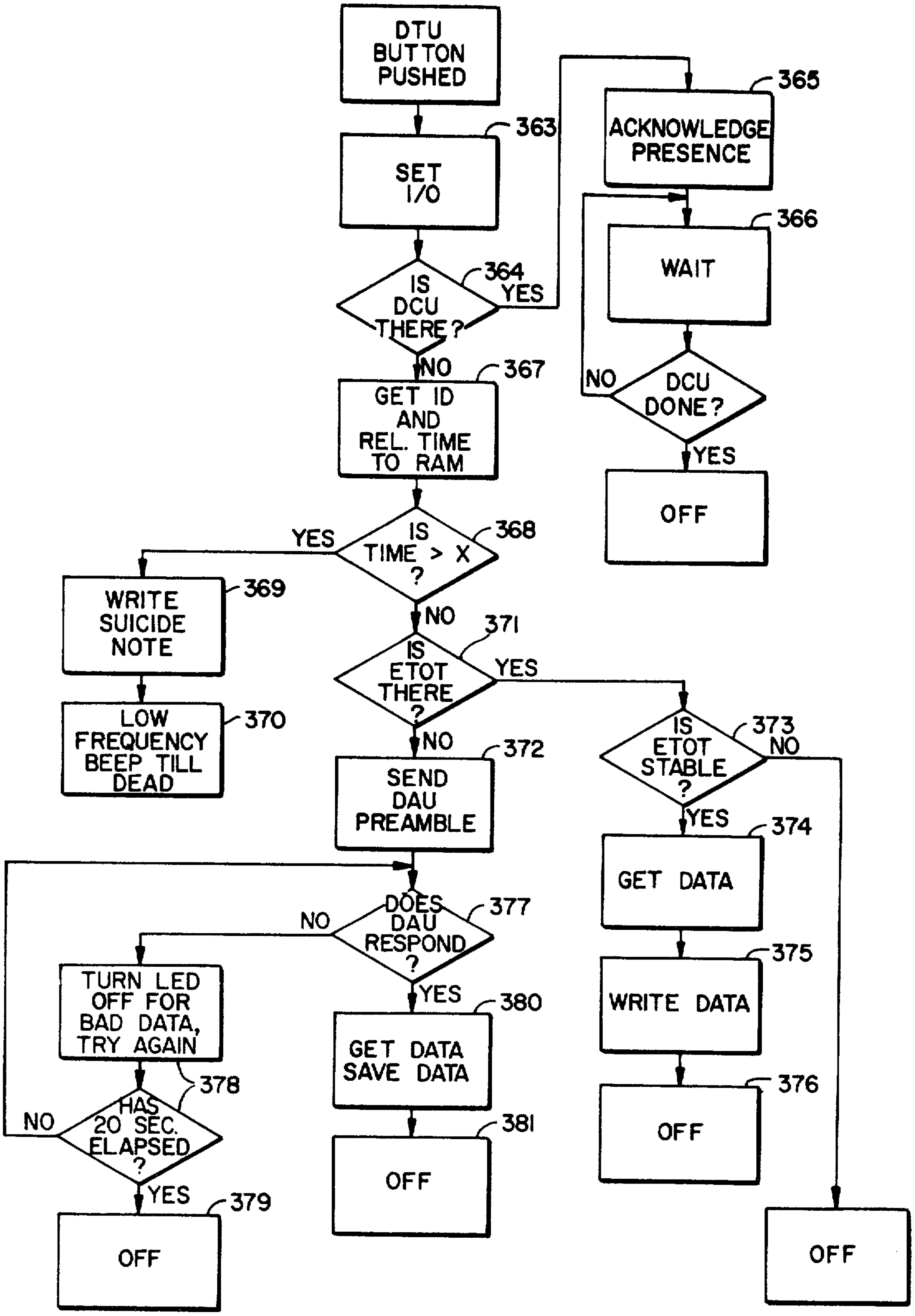
FIG. 7 is a flow chart illustrating the programming routine for the DTUs.

Referring now more particularly to FIG. 7, a rough indication of the sequence of DTU operations will be described. When the microprocessor 320 is turned on by means of switch 315 or an enable DTU signal from connector 306, the microprocessor 320 begins with its set I/O step 363. The I/O pins are thus prepared to send and receive data. Next, the microprocessor 320 examines its pin $P_{15}$ to see if the DCU is present (step 364). If the DCU is present, the DTU sends out an acknowledgement of its presence from pin $P_{15}$ (step 365). The DTU then waits at step 366. If the DCU is not present, the microprocessor 320 loads the DTU ID and the DTU internal clock into the RAMs 327 and 328 (step 367). In step 368, the microprocessor 320 examines the DTU internal clock data and determines whether the time that has elapsed since the DTU was last plugged into the DCU is greater than a predetermined period which is stored in the microprocessor program. If the time period is greater, the microprocessor 320 writes into the magnetic tape mass storage a notation that the DTU has been away from the DCU longer than permitted (step 369). This is necessary to indicate that the expected charge-life of the batteries has been exceeded, thereby casting doubt on the reliability of the data. The microprocessor 320 then causes a low frequency signal to be emitted from the ceramic beeper 350 to indicate that DTU power has been shut down (step 370).

If the elapsed time period is not greater than allowed, the microprocessor 320 then examines pin $P_{13}$ to determine whether ETOT is present (step 371). If ETOT is present, the microprocessor 320 checks to see that ETOT is stable (step 373). If ETOT is stable, LED 349 is turned on to indicate a good connection and the "get data" routine is executed (step 374). When data has been transferred, the DTU then writes the data into the magnetic tape storage (step 375). When the data have been written into mass storage, the DTU shuts off (step 376). If ETOT is not stable (step 373) the microprocessor 320 proceeds as though ETOT were not present (step 371). When ETOT is not present, or ETOT is unstable, the microprocessor 320 proceeds to send the DAU preamble (step 372). In the next step, step 377, the microprocessor 320 determines whether the DAU has responded. If there is no response, microprocessor 320 proceeds to step 378 which causes the DAU preamble to be sent again, unless the preamble has already been sent a number of times, and either bad data are still being transmitted or there is still no response. If such is the case, the DTU is turned off in step 379 to conserve power. If the DAU does respond the microprocessor 320 proceeds into its "get and save data" routine (step 380). When step 380 is completed, the DTU is turned off (step 381).

The magnetic tape mass storage 2E that is used in the DTU is a Microcommunications Corporation Electronic R/W System Model No. 25-300. This system is used according to directions in the installation planning manual copyrighted May, 1979.

In the DTU "get and save data" routine, the DTU receives data from either the DAU 1A or the ETOT 1B. Temporarily, the data are stored in RAMs 327 and 328 until the data can be written into magnetic tape mass storage 2E. When the data transfer to RAMs 327 and 328 is complete, the DTU emits an audible beep from ceramic beep 350. This tells the route person that data transfer is complete and that the connection may be severed. During this period, the DTU is writing the data into the magnetic tape mass storage 2E.

Data Converting Unit (DCU)

The centrally located DTU 3 which receives the portable information carried by the DTUs is designed to couple mechanically with the transfer units and discharge their contents which are decoded immediately for output in printed summary form as well as for online use to provide a standardized computer terminal output in the universal language known as RS232C. This standardized language is acceptable by all present computers and is in the ASCII format utilized by all models and remote operating terminals in data processing systems throughout the world. The printed summary form gives total sales and cash in each machine and total sales by DTU route.

The format of the information content of the DCU report is standardized in a machine by column, by cash series which can be processed in any desired form of summary by a standard data processing installation. With unit sales and cash data available from the DTU as a direct input for data processing installation, manual entry with its expense and probability of human error in transcription is eliminated.

Figure 8:
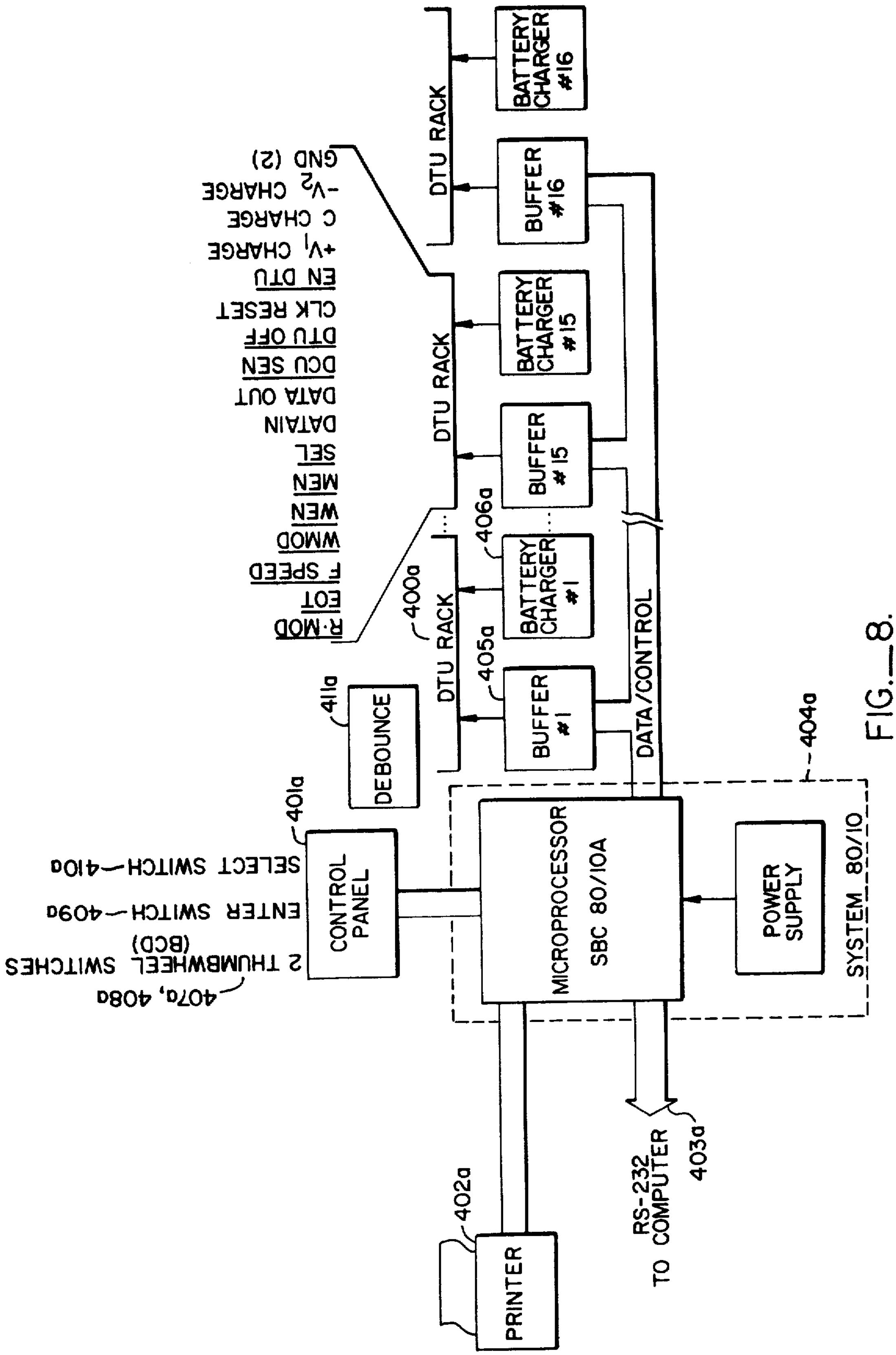
FIG. 8 is a block diagram of the data converting unit portion of the system according to the invention.

Referring now to FIG. 8, the DCU consists of a DTU rack 400a which accepts up to 16 separate DTUs at one time, a control panel 401a for entering time/date, format, and scramble code information, a printer 402a, a serial data output 403a in RS-232 format, and an 80/10 single board computer system 404a. The 80/10 single board computer system, hereinafter referred to as the 80/10, is connected to the DTU rack through buffering circuitry (for example, buffering circuit 405a) which will be described in greater detail later. Data control signals are sent and received through the following ports of the 80/10: port E5H, port E6H, port E8H and port E9H. The DTU rack 400a also receives voltage levels from battery charger circuitry (e.g., battery charger circuitry 406a), which will be described in greater detail later, for the purpose of charging DTU batteries and monitoring voltage levels.

The control panel 401a consists of 4 distinct switches: two thumbwheel switches 407a and 408a, an enter switch 409a, and a multi-position select switch 410a. Enter switch 409a is connected to 80/10 port E5H (2) through a debounce and edge triggered circuit, to be described in greater detail later. The two thumbwheel switches 407a and 408a are connected to 80/10 ports E8H (0–3) and EAH (4–7). These thumbwheel switches provide binary coded decimal (BCD) information directly to the 80/10. The select switch 410a controls the designation of the data entered by enter or rocker switch 409a and thumbwheel switches 407a and 408a. Designations that may be selected through select switch 410a are: date, time, format (either standard, expanded or repeat), and scramble code. The select switch is directly connected to 80/10 port E5H (4–7).

The printer 402a is connected to the 80/10 through 8 data output lines from port E4H (0–7), 1 strobe line from port E6H (5), 1 busy line from E5H (3). Raw data are supplied in serial RS232 format from the serial data output port of the 80/10.

The 80/10 consists of the SBC80/10A computer and associated power supply.

Information is transferred from the control panel 401a to the 80/10 in the following manner. The select switch 410a is set to the type of data sought to be inputted. When a report format is sought to be designated, the select switch 410a need only be positioned to so designate the format. The positions of thumbwheel switches 407*a* and 408*a*, as well as enter switch 409*a*, are irrelevant. On the other hand, if the date, time, or scramble code is desired to be entered, the select switch 410*a* must be positioned to the desired item, and the thumbwheel switches 407*a* and 408*a* must be set to the desired numerical information. The enter switch 409*a* must then be depressed to signal the 80/10 that the information is to be entered. The signal switch 409*a* is then debounced and edge triggered by debouncing circuit 411*a* and then introduced into port E5H of the 80/10.

The typical operation and interaction between the control panel, the 80/10, and the DTUs in the DTU racks will now be described. Please refer to DCU circuit diagram FIG. 11 and function flow chart FIG. 12.

Figure 12:
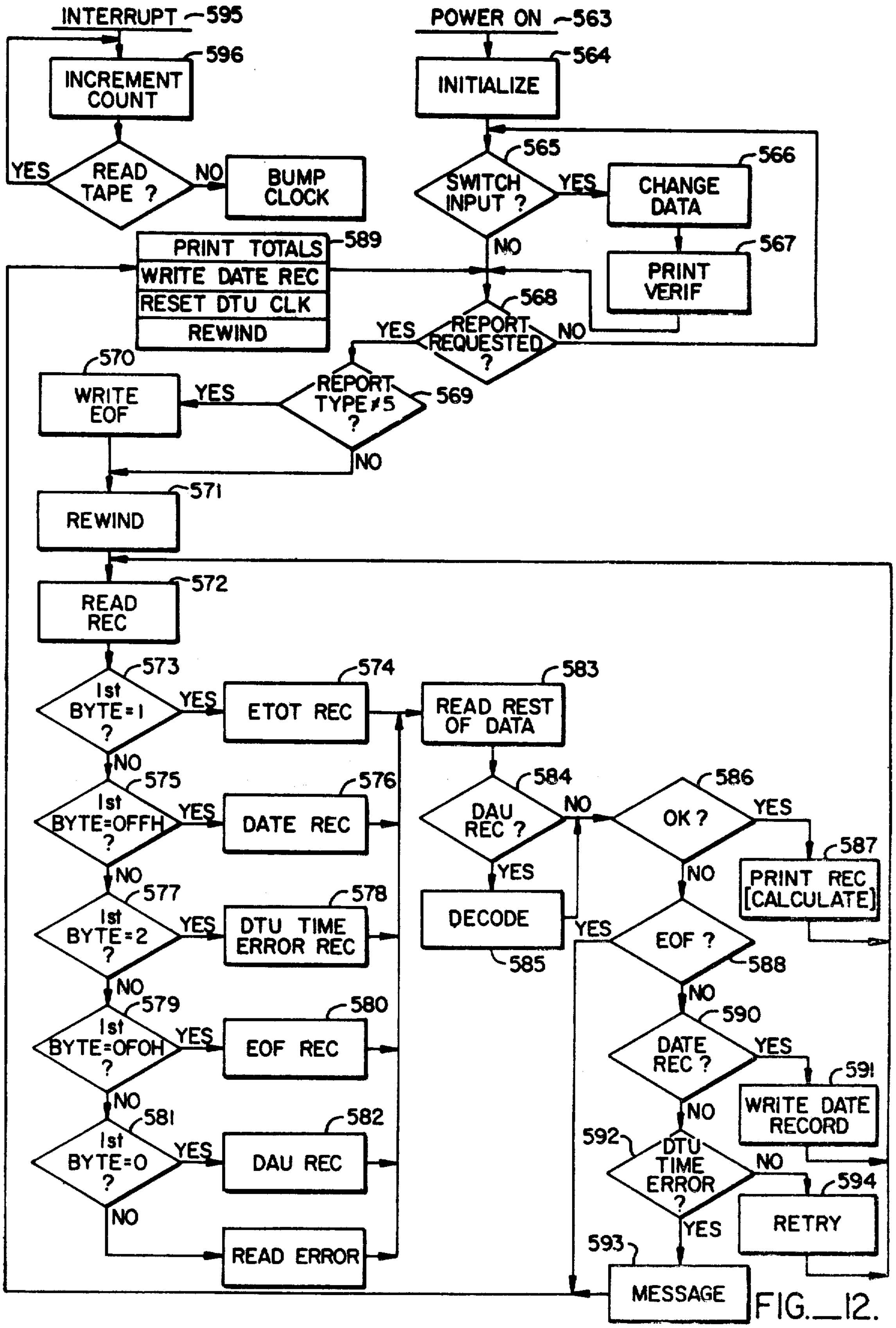
FIG. 12 is a function flow chart for use in explaining the operation of the data converting unit portion of the system.

Referring now to FIG. 12, when the DCU is first powered-up (step 563), the date, time, scramble code, printer control, and input/output controls are initialized (step 564). The DCU then enters a perpetual and continuous loop (starting at step 565) in which input data are received from thumbwheel switches 526 (407*a* in FIG. 8) and 527 (408*a* in FIG. 8), select switch 528 (410*a* in FIG. 8), and enter switch 529 (409*a* in FIG. 8); DTUs are interrogated; data are evaluated; report summaries are printed; and raw data in ASCII and RS232 format are outputted.

Step 565 begins this continuation loop by examining the state of the enter line 533. If new data have been entered, the data within the DCU will be updated at step 566 and a verification of such update will be printed at step 567. The DCU then proceeds to determine whether the DTU ready lines (i.e., output of inverter 524) indicate that a DTU is present which has yet to be interrogated by the DCU at step 568. A zero state on the DTU ready indicates that either no DTU is present or that a DTU is present which has already been interrogated by the DCU. In such case the DCU returns to step 565. When the DTU ready line is high the DCU proceeds to step 569. When a DTU is first plugged into the DCU, its tape is positioned at a point just following its last data entry. On its first access to the DTU tape, the DCU will first write and end-of-file (EOF) mark onto the tape. This is to ensure that old data, which are still present on the unused (on the present data collection round) portion of the tape, will not be processed. The DCU then rewinds the tape to its beginning and commences to read the data record.

The DCU software contains a feature which allows a computer, on the RS-232 data line (403*a*, FIG. 8), to order a re-reading of the record of a DTU that has already been interrogated by the DCU but remains in the DTU rack (400*a*, FIG. 8). When in such mode, no new EOF or data record need be written into the DTU tape, therefore the need for step 569.

In this step, the DCU determines whether an end-of-file (EOF) mark should be written into the DTU tape record. If so, the DCU writes an EOF mark onto the tape in its present position at step 570. The DCU writes into the tape by applying a four-bit code to inputs A, B, C, and D of a 4-to-16 line decoder 508 which corresponds to the DTU sought to be accessed. For each distinct combinations of "ones" and "zeros" applied to the decoder 508 inputs there, one of the 16 output lines is activated.

Figure 11A:
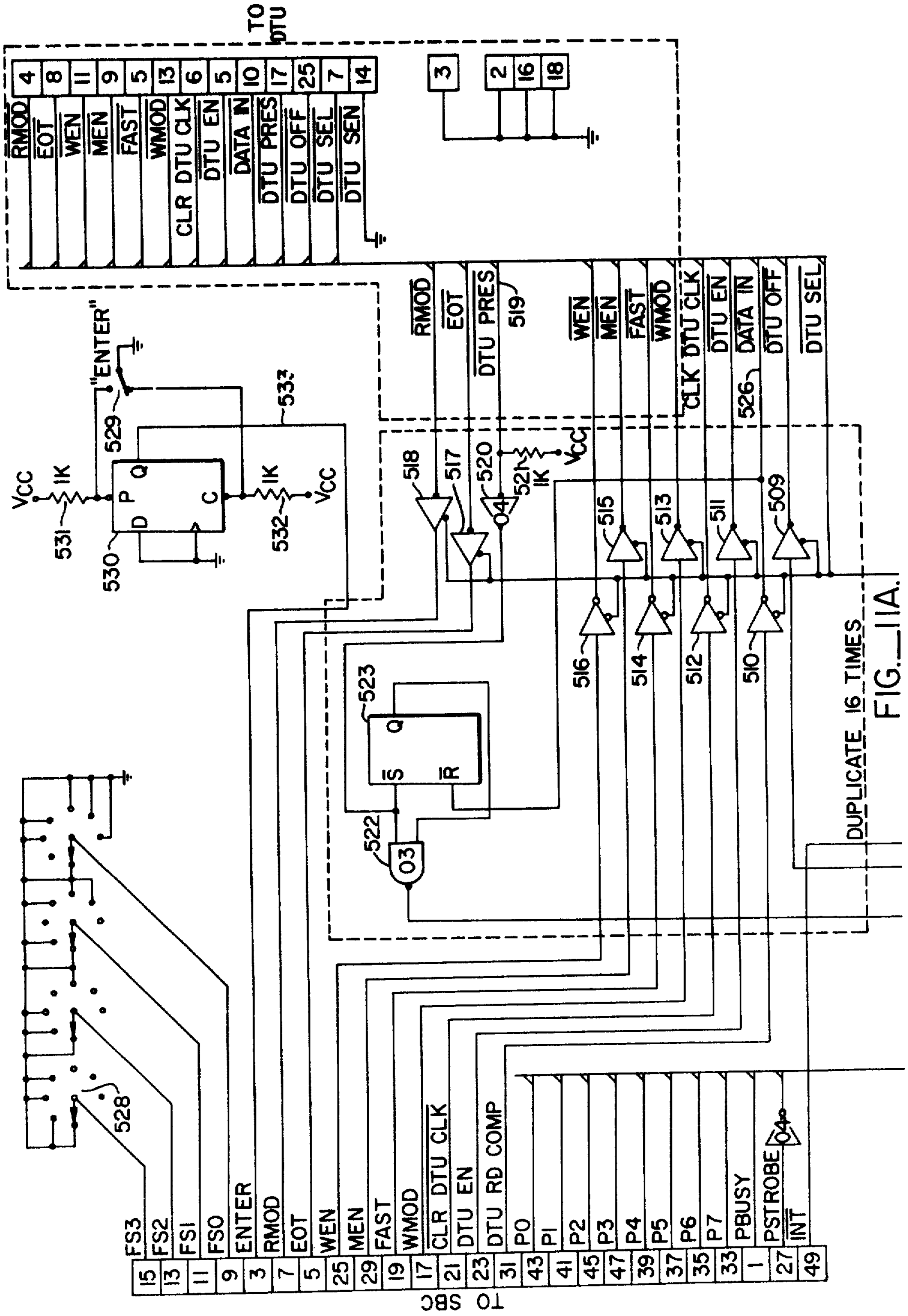
FIG. 11 is a schematic diagram of the data converting unit portion of the system according to the invention.
Figure 11C:
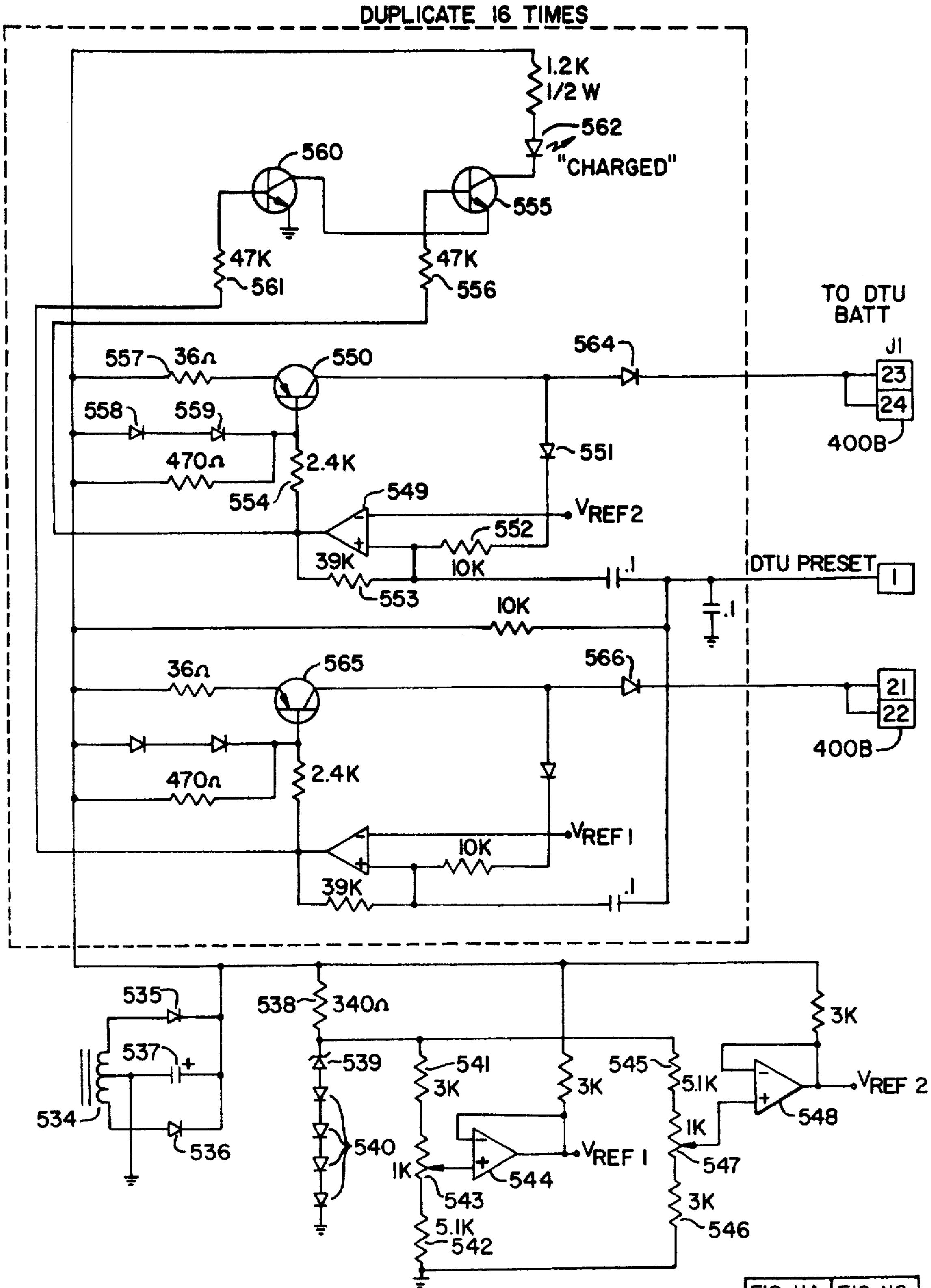
Figure 11:
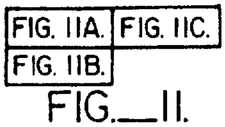

In FIG. 11 circuitry is shown (buffering circuitry 405*a*, FIG. 8) which is activated when the code, which activates output terminal 0 of the decoder 508, is applied to the decoder 508 four-bit input A, B, C, and D. For each of the outer input lines, there is a similar associated set of circuitry. The effect of an output at the line decoder 508 is to enable all of the buffer circuitry which connects the control ports of the 80/10 with the control lines to the DTU in rack position 0. (I.e., the position which corresponds to the four-bit code input into line decoder 508.) These buffers 509 through 518 act to buffer, switch, and invert the signals on the DTUOFF, DATAIN, DTUEN, DTU CLK, WMOD, FAST, MEN, WEN, EOT, and RMOD control lines to the DTU. By selectively enabling the buffers corresponding to the DTU rack position, one set of control lines from the 80/10 may be used to control any one DTU out of 16 DTUs that may be connected to the DCU at one time.

Control signals and data signals can thereby be directed to or received from the desired DTU without disturbing any of the other DTUs in the DTU rack. Control of, reading from, and reading into the DTU magnetic tape mass storage are accomplished according to direction in the installation planning manual, supra. The next step is to rewind the tape to its beginning—step 571.

The decoding of the information by the DCU requires first that the DCU distinguish between the records of the various DAUs and ETOTs interrogated by the DTU. Each record is separated by an inter-record gap and a 20-bit all-ones preamble preceding it, and a check sum following it. The DCU determines whether the record is from a DAU or ETOT by a first data byte of zero for a DAU and a first data byte of 01 for an ETOT. The byte format within each record is a standard asynchronous format with a zero start bit, then eight data bits followed by a parity bit, an interbyte delay and two stop bits.

Each bit is pulse code modulated, of 800 msec length, with the first 200 msec always high and the last 400 msec always zero.

Once the tape has been rewound to its beginning (step 571), the first six bytes of the record are read at step 572. If the first byte is a "one" the DCU recognizes that the next 11 bytes constitute an ETOT record (steps 573 and 574). If the first byte is equal to "OFFH" the DCU recognizes that the next 12 bytes constitute a date record (steps 575,576) If the first byte is equal to "2" the DCU recognizes that the next 6 bytes constitute a DTU time error record (steps 577,578). If the first byte is equal to "OFOH" the DCU recognizes that the next 5 bytes consitute an end-of-file (EOF) indication (steps 579,580). If the first byte is equal to "0" the DCU recognizes that the next 260 bytes constitute a DAU record (steps 581,582). Once the type of record has been determined, the remaining bytes within the record are read at step 583. If a DAU record has been read at step 584, it is decoded in step 585 by XORing the data bytes with the scramble code. In step 586 if the record was a DAU or an ETOT record, the DCU proceeds to print out a summary of that particular record at step 587. In step 587 the calculations which determine the TIME, SALES TOTALS, CASH TOTALS and ITEM counts are performed, and the results printed.

The time of any access, power down, or entry is computed using the DCU time at which the DTU internal clock was reset, and the DTU time at which the DAU was interrogated, or the DAU time at which power was lost, or when an entry occurred. If the DTU time is known, the elapsed time since the DTU clock was reset may be calculated using the known 32.7 Hz DTU clock rate. This elapsed time is then used to adjust the DCU time at which the DTU clock was reset, to arrive at the desired time data.

When time is known according to DAU time (as when there has been an entry or power down), the known DAU clock rate of 13.65 minutes per scan loop is used to calculate the elapsed time between the event and the last known DAU time for which there is a DTU time reference (or to count back from the time the DTU accessed the DAU). As before the DAU time can then be referenced back to the DCU time via the DTU time.

The sales in dollars are computed using the Accepted Total, Change Total and Sales at Cash Collect data. Accepted Totals and Change Totals are running counts, are expressed in an equivalent number of nickels, and are not reset by an access to the DAU or coin box. The difference between Accepted Totals and Change Totals is equal to the Total Sales since the DAU was first powered up. Sales at Cash Collect represent the total cumulative sales, expressed in an equivalent number of nickels, at the time of the last cash box movement. The Sales Totals since the last cash box movement is then equal to Accepted Total—Change Total—Sales at Cash Collect.

Cash box totals are derived by adjusting the Sales Totals according to changes in the Change Tube Levels. Coins accepted by the machine are diverted into the cash box only after the change tubes are full. Therefore, the change tube levels at the time of the last cash box movement must be accounted for. The amount of cash in the cash box will differ from the sales totals by the amount of cash necessary to change the level of the coin tubes from their levels at the time of the last cash collect to their present levels. The cash box total is then equal to (Accepted Total—Change Total—Sales at Cash Collect)—(Change Tube Present—Change Tubes at Last Cash Collect).

Calculations within the DCU in the described embodiment are performed on data provided solely by the DAU. However, because the 80/10 contains the facility for additional mass data storage, a data base could easily be maintained in the DCU itself. In such case more detailed and route-specific information may be maintained and included in the RS-232 output lines and in the printed summaries.

After step 587, the DCU then proceeds back to step 572 and reads the next record. If, however, in step 586 an EOF record, date record or DTU time error record is encountered the DCU will proceed instead to step 588. In step 588, if an EOF record is present, this indicates to the DCU that the DCU has come to the end of the DTU tape record. The DCU then proceeds to step 589 in which it rewinds the tape, resets the DTU clock, writes the date record, shuts the DTU down, and prints the total of all the DAU and ETOT sales reported on the tape. After step 589, the DCU returns to step 568 and searches for another DTU to interrogate.

If a date record is present at step 590, the DCU will write and print the date record in step 591 and then return to step 572 and read the next record on the tape. If a DTU time error indication is present at step 592, the DTU will output a message to indicate such an occurrence at step 593. The DCU will then proceed to step 589. If a read error is present, the DCU will try to read the record again.

Thus, it can be seen that when the DCU first accesses a DTU the first record it will read will be the date record. It writes this into memory and onto the summary report. The DCU proceeds to read the subsequent records, printing the totals for each record. This it does until an end-of file or a DTU time error record is encountered. When this occurs, the DCU exits from the loop, prints the totals of the transactions, rewinds the tape to the beginning and writes the date record onto the tape, and then shuts down the DTU. Having done this, the DCU then proceeds to scan the other rack positions to determine whether there are other DTUs that need to be interrogated.

The printed summary from the DCU is available in regular and expanded format and is selected by a switch located on the DCU chassis. The regular format is called the "Route Sales/Cash Summary" and includes the route person ID number, the date (provided by thumbwheel switch settings on the DCU chassis), a listing (by time, machine type, and number) of sales totals and cash box totals for each machine accessed, as well as the number of times the cash box for each machine had been touched, and the total sales for the whole route. The expanded format is called the "Expanded Route Sales/Cash Summary" and includes, in addition to he information given in the regular format, a breakdown by number of sales per column for each vending machine interrogated. In both formats, the occurrence and time of any loss of power to the machine is indicated.

The DCU maintains a real time clock by monitoring the 60 Hz line power frequency. In FIG. 11, this 60 Hz signal is amplified by transistor 501, shaped by Schmidt trigger 504, and divided by 15 by counter 505 to yield a 250 msec pulse period. The interrupt procedure 595 calls the increment count step 596 for every four of the 250 msec pulses it receives. Step 596 counts the number of times it is accessed by step 595 and indicates when an hour has passed.

Referring now to FIG. 11, the internal DCU real time clock is derived through the use of combination of hardware and software which shapes and counts a 60 Hz signal provided by the 80/10. The 60 Hz signal is applied to one end of resistor 500. The other end of resistor 500 is connected to the cathode of diode 502 and the base of transistor 501. The emitter of transistor 501 is connected to ground and to the anode of diode 502. The collector of transistor 501 is tied to $V_{cc}$ through resistor 503 and is also connected to the input of Schmidt trigger 504. In this configuration transistor 501 is a common emitter amplifier whose input is clamped in the negative-going direction by diode 502. Since the 60 Hz signal applied to resistor 500 is purely an alternating current signal, the voltage applied will vary between positive and negative values. When the voltage is positive, current will flow through resistor 500 into the base of transistor 501, causing transistor 501 to conduct. When transistor 501 conducts, current flows into the collector of transistor 501 through resistor 503. There is a resulting voltage drop across resistor 503 which results in a lowering of the voltage level at the input to Schmidt trigger 504 for greater levels of current flowing into the collector of transistor 501. When the 60 Hz signal reaches a level of less than one volt in its transition towards negative levels, current ceases to flow into the base of transistor 501. When this occurs, transistor 501 is shut off and collector current will no longer flow. The voltage drop across resistor 503 will be negligible and the voltage presented to the input of Schmidt trigger 504 will be approximately $V_{cc}$.

As the 60 Hz signal applied to resistor 500 falls below zero volts, the cathode of diode 502 is at a more negative voltage than the anode. Diode 502 will then begin to conduct, essentially holding the base of transistor 501 at about −0.7 volts. This ensures that the breakdown voltage of the base-emitter junction of transistor 501 is not exceeded. Thus, it may be seen that when a 60 Hz signal is applied to resistor 500, the result is a signal applied to the input of the Schmidt trigger 504 with essentially the same period but with levels varying from a minimum of zero volts to a maximum of $V_{cc}$. Schmidt trigger 504 is used to "shape" the signal that is applied to the clock input of counter 505. Counter 505 is arranged so that a bit is loaded into the "1" input (terminal A) and clocked through 15 counts by the Schmidt trigger 504 output. On the 15th count, a "ones" state is output from terminal $Q_D$ of counter 505 into the clock input of D flip-flop 506. At the same time a "one" is output at the carry terminal of counter 505, inverted by inverter 507, and then applied to the LOAD input of counter 505. This causes another "one" to be loaded into terminal A of counter 505. The counter thus begins another count up to 15 and then, as before, outputs another clock pulse to D flip-flop 506. Since the clock input to counter 505 is at a 60 Hz rate, i.e., 16.67 msec per period, the effect of counter 505's count up to 15 is to produce a clock signal to D flip-flop 506 every 250 msec.

D flip-flop 506 is configured so that each pulse from counter 505 causes a "one" to be loaded into the flip-flop. This results in a "zero" output from flip-flop 506 which is then connected to the 80/10 interrupt line. The 80/10 INTA line is connected to the CLR input of the D flip-flop 506 and acts to clear the flip-flop output until the next pulse from counter 505 occurs. The internal software of the 80/10 counts four output pulses from the D flip-flop 506, to derive a one second time interval.

The DTU present line 519 receives a connection to ground when a DTU is present in the DTU rack position (400*a*, FIG. 8). This connection to ground causes the input to inverter 520 to be low, thus causing the output of inverter 520 to be high. When no DTU is present, resistor 521, one end of which is connected to $V_{cc}$ and the other end to input line of inverter 520, causes the input to inverter 520 to go high, thus causing the output of inverter 520 to go low. The output of inverter 520 is connected to one input of NAND gate 522 and the SET input of RS flip-flop 523. When the output of inverter 520 is low, this low level causes the output of NAND gate 522 to go high and also causes the output of RS flip-flop 523 to go high. It should be noted that the inputs to RS flip-flop 523 respond to negative logic; therefore a zero input at the set input results in a "ones" output, and a "zero" level into the reset input results in a "zero" level output.

Thus, it can be seen that when no DTU is present, resistor 521 applies a high level to inverter 520 which, in turn, applies a low level to NAND gate 522 and the set input of RS flip-flop 523. The output of RS flip-flop 523 applies a "ones" input to NAND gate 522. In this state, if a DTU is then inserted into the rack, the DTU present line 519 will be set to a low level causing inverter 520 to output a "ones" level. This high level applied to NAND gate 522 (the other input being already at a high level), the output of NAND gate 522 will go low. Thus, it may be seen that when a DTU is absent from the particular DTU rack position, the combination of NAND gate 522 and RS flip-flop 523 will cause a high output from NAND gate 522, and when a DTU is inserted, it will cause a low output from NAND gate 522.

The output of NAND gate 522 is connected to the input of inverter 524 as well as to one end of resistor 525. The other end of resistor 525 is connected to $V_{cc}$. The output of inverter 524 is connected to the DTU ready line to the 80/10. When the NAND gate 522 output if high (indicating that no DTU is present), resistor 525 applies a high level to the input of inverter 524. This results in a low output at inverter 524 and indicates that the DTU is not ready to be interrogated.

On the other hand, when a low level is present at the output of NAND gate 522 (indicating that a DTU is present), a low level is applied to the input of inverter 524. This results in a high level at the output of inverter 524 and indicates to the 80/10 that the DTU is ready to be interrogated. When a DATAIN signal is received on DATAIN line 526, the reset line of RS flip-flop 523 is connected to ground. This results in a "zero" output from RS flip-flop 523. This low level output applied to the input of NAND gate 522 causes a high output from NAND gate 522. This, in turn, causes a low output from inverter 524, thus indicating that the DCU has completed the data transfer.

As described earlier, the scramble code, the date, and report format data are input into the 80/10 through the use of switches located on the front panel of the DCU (401*a*, FIG. 8). Date/Time thumbwheel switches 526 and 527 (407*a*, 408*a*, FIG. 8) convert the decimal number displayed to the user into binary to be input into the 80/10.

The select switch 528 (410*a*, FIG. 8) is a seven-position, four-pole wafer switch. In the first position (corresponding to a four-bit code of 0000), the scramble code is selected. The second position (0001) corresponds to the hour. The third position (0010) corresponds to the day. The fourth position (0100) corresponds to the month. The fifth position (1000) corresponds to repeat report. The sixth position (1100) corresponds to the expanded report format. The seventh position (1110) corresponds to standard report format. The enter switch 529 (409*a*, FIG. 8) is used to enter date and time information into the DCU. The wiper of switch 529 is connected to ground, while the normally closed terminal is connected to the CLR input of D flip-flop 530. The normally open terminal of switch 529 is connected to the preset input of D flip-flop 530. The preset input to D flip-flop 530 is also connected to $V_{cc}$ through resistor 531. The CLR input to the flip-flop 530 is connected to $V_{cc}$ through resistor 532. This configuration operates as a debouncing circuit 529*a* (411*a*, FIG. 8). This is because the preset and clear inputs to the flip-flop 530 respond to a change in level from one to zero.

Once the change has occurred at one input, any subsequent variation of the level at that input will not affect the state of the device. (I.e., when the preset line has been activated, no later reapplication of ground to the preset input will change the output state of the device unless ground has first been reapplied to the CLR input, and vice versa.)

When enter switch 529 is depressed, the normally open contact is connected to ground. This causes the preset input to be connected to ground thereby causing the output of the flip-flop 530 to go high. This high level is applied to the enter line of the 80/10, 533. When the enter switch 529 is released, the normally closed contact is connected to ground, thus reapplying a ground connection to the CLR input. The output of the flip-flop 530 then returns to a low level.

The DTU battery recharging circuitry (406a, FIG. 8) will now be described. Line power to the DCU is applied to a transformer 534. The secondary of transformer 534 produces 18 Vrms center tapped, at 1.5 amps. This voltage is applied to a fullwave rectifier formed by diodes 535 and 536. The cathodes of diodes 535 and 536 are tied to filter capacitor 537. The voltage at this point is the unregulated supply voltage supplied to all of the battery recharger circuit boards and to the voltage reference circuitry.

The voltage reference circuitry will now be described. Zener diode 539, the anode of which is connected to the equivalent anode 540 of four diodes connected in series (the equivalent cathode of which is connected to ground), is used in conjunction with resistor 538 to obtain a stable voltage level of about 20.8 volts. The 18 volt break-down voltage of the Zener diode 539, plus the four diode drops of 0.7 volts a piece, results in the 20.8 volt level. The four diodes 540 also supply temperature compensation.

This stable voltage level which is present at the junction of resistor 538 and diode 539 is used to supply the voltage level for two voltage dividers. The voltage divider formed by resistors 541, 542 and variable resistor 543 supplies an adjustable voltage level to voltage follower 544. The voltage follower 544 is essentially a voltage comparator connected as a unity gain amplifier. Variable resistor 543 allows the input level to voltage follower 544 to be varied over at least a 15% range. The output of voltage follower 544 can therefore be set to a precise level and will remain relatively constant over temperature variation. In a similar manner, a second voltage reference is derived using resistors 545, 546 and variable resistor 547 and voltage follower 548.

These voltage references are supplied to the negative input of voltage comparators and compared against the voltage level of the batteries being recharged.

For example, voltage reference 2 from voltage follower 548 is applied to the negative input of voltage comparator 549. The positive input of voltage comparator 549 is connected to the collector of transistor 550 through diode 551 and resistor 552. The positive input of voltage comparator 549 is also connected to the output of the comparator 549 through resistor 553. In this configuration, comparator 549 acts as a switch—resistor 553 in combination with resistor 552 acting to provide hysteresis. When the DTU batteries are in a discharged state the collector of transistor 550 will be at a voltage below that of voltage reference 2. With this combination of voltages, the output of voltage comparator 549 is about zero volts. The output of comparator 549 is connected to the base of transistor 550 through resistor 554, as well as to the base of transistor 555 through resistor 556. When the output of voltage comparator 549 is at zero volts, the result is that base current flows out of the base of transistor 550 through resistor 554 into the output of the voltage comparator 549. In addition, transistor 555 is essentially turned off, due to the lack of base drive. In this state, maximum base current is being supplied to transistor 550. However, the resulting current out of the collector of transistor 550 is limited.

This limitation is implemented by connecting the emitter of transistor 550 to the unregulated power supply voltage through resistor 557, and by connecting diode 558 in series with diode 559 between the unregulated power supply voltage and the base of transistor 550. The anode of diode 558 is connected to unregulated power supply voltage. The cathode of diode 558 is connected to the anode of diode 559, and the cathode of diode 559 is connected to the base of transistor 550. Diodes 558 and 559 essentially clamp the voltage drop across resistor 557 to approximately 0.7 volts. This, in turn, sets the current into the emitter of transistor 550 to a constant value and hence limits the current out of the collector. Thus, it may be seen that in this configuration transistor 550 acts like a constant current source. When the voltage level at the collector of transistor 550 rises above the reference voltage level, the difference between the two levels causes the output of comparator 549 to go high. This effectively eliminates base current from transistor 550, thereby shutting transistor 550 off. This high output level of voltage comparator 549 provides base drive, through resistor 556, into the base of transistor 555. If base drive is already being supplied to transistor 560 through resistor 561 from the other charging circuit ($V_{ref1}$), current will flow through transistors 555 and 560, and thus through light emitting diode (LED) 562, indicating that the DTU batteries are charged. The combination of transistors 555 and 560 is essentially an AND gate, therefore both DTU batteries must be charged to the proper level before LED 562 lights. (The current source circuit using voltage reference 1 operates in an identical manner to that of current source circuit using reference 2.)

When a DTU 2 is connected to the DCU 3, the outputs of the battery charging circuits are connected to the DTU batteries, 300 and 301. The collector of transistor 550 is tied, by line 563 through diode 564 and pins 23 and 24 of DCU connector 400B, to the positive terminal of battery 300. Similarly the collector of transistor 565 is connected, through diode 566 and pins 21 and 22 of DCU connector 400B, to the positive terminal of battery 301. Diodes 564 and 566 are blocking diodes which prevent current from flowing into the battery charging circuitry, from the batteries, when the charging circuits are shut off.

While in the above described embodiment certain forms of signal couplings (ie. phototransistors 70, 354 and LED's 69 and 360) are described for the transfer of information between the DAU and the DTU, in other embodiments other types of signal couplings can be advantageously used. In such other embodiments these elements (70, 354, 69 and 360) are replaced with corresponding accoustic (e.g. a piezo-ceramic transducer), inductive, or capacitive couplings.

In other modified embodiments the sensors, such as switch 29B for example, can be a magnetically activated switch or a retroflective sensor (ie. a photosensor with a self-contained light source and reflective strip).

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

What is claimed is:

1. A data collection system for use with one or more vending machines of the type which dispense either products or services for money received and which have an access door and a money box, the data collection system comprising separate data acquisition means resident in a plurality of vending machines for sensing and counting money received and the products or services dispensed for each vending machine and for summarizing said data, the data acquisition means including memory means for storing the summarized data; and data transfer means for selectively interrogating a plurality of said data acquisition means to receive the summarized data from each of said data acquisition means, said data transfer means having means for supplying an identification code number signal, by which said data transfer means identifies itself, to each data acquisition means interrogated by said data transfer means, and wherein the data acquisition means stores the identification code number as part of the summarized data in the memory means.

2. The vending machine data collection system as recited in claim 1 wherein the data acquisition means include access door sensor means for sensing whether the vending machine access door is closed; and alarm means coupled to the door sensor means for generating an alarm if the access door is opened prior to the receipt of the identification code number from the data transfer means.

3. The vending machine data collection system as recited in claim 2 wherein the alarm means include means for generating an alarmed-opening indication whenever the alarm is generated, and further wherein the data acquisition means stores the alarmed-opening indication as part of the summarized data in the memory means.

4. The vending machine data collection system as recited in claim 3 wherein the data acquisition means further include clocking means for maintaining a continuously updated, relative time signal, and further wherein the data acquisition means stores the relative time signal from the clocking means, as part of the summarized data in the memory means, whenever the data acquisition means is interrogated by the data transfer means.

5. The vending machine data collection system as recited in claim 3 further including data converting means for receiving the summarized data from the data transfer means and for analyzing the summarized data from each data acquisition means interrogated by the data transfer means to output an access report for each interrogated data acquisition means, the report listing the identification code number of each data transfer unit which attempted an interrogation of the particular data acquisition means, the time signal at interrogation and the alarmed-opening status of the interrogation.

6. The vending machine data collection system as recited in claim 1 wherein the means for supplying an identification code number signal is a diode array.

7. The vending machine data collection system as recited in claim 4 wherein the data acquisition means further include means for counting the money received less the money returned as change and means for counting the products dispensed, and further wherein the data acquisition means record the money count and the product count whenever the door is accessed.

* * * * *